United States Patent
Miura et al.

(10) Patent No.: US 10,933,597 B2
(45) Date of Patent: Mar. 2, 2021

(54) PRESS-MOLDING MATERIAL INCLUDING DISCONTINUOUS REINFORCING FIBERS AND THERMOPLASTIC RESIN AS MATRIX, SHAPED PRODUCT THEREOF, AND MANUFACTURING METHOD FOR SAME

(71) Applicant: Teijin Limited, Osaka (JP)

(72) Inventors: Kaori Miura, Osaka (JP); Tetsuya Yoneda, Osaka (JP); Hiroyuki Shimizu, Osaka (JP)

(73) Assignee: Teijin Limited, Osaka (JP)

( * ) Notice: Subject to any disclaimer, the term of this patent is extended or adjusted under 35 U.S.C. 154(b) by 364 days.

(21) Appl. No.: 16/065,329

(22) PCT Filed: Dec. 20, 2016

(86) PCT No.: PCT/JP2016/087960
§ 371 (c)(1),
(2) Date: Jun. 22, 2018

(87) PCT Pub. No.: WO2017/110811
PCT Pub. Date: Jun. 29, 2017

(65) Prior Publication Data
US 2020/0282670 A1    Sep. 10, 2020

(30) Foreign Application Priority Data

Dec. 25, 2015   (JP) .............................. JP2015-254639

(51) Int. Cl.
*B29C 70/46*    (2006.01)
*B29C 43/18*    (2006.01)
(Continued)

(52) U.S. Cl.
CPC .............. *B29C 70/46* (2013.01); *B29C 43/18* (2013.01); *B29C 43/34* (2013.01);
(Continued)

(58) Field of Classification Search
CPC ......... B29C 70/46; B29C 43/18; B29C 43/34; B29K 2102/12; B29K 2105/0872; B32B 2260/046; B32B 2262/106
(Continued)

(56) References Cited

U.S. PATENT DOCUMENTS

2005/0082852 A1* 4/2005 Corscadden ............ B60R 19/18
293/120
2010/0186882 A1 7/2010 Edelmann et al.

FOREIGN PATENT DOCUMENTS

GB          841371 A    7/1960
JP       S51-009154 A   1/1976
(Continued)

OTHER PUBLICATIONS

Feb. 7, 2017—(PCT/JP) Written Opinion of the International Searching Authority—App 2016/087960—Eng Tran.
(Continued)

*Primary Examiner* — William K Cheung
(74) *Attorney, Agent, or Firm* — Banner & Witcoff, Ltd.

(57) ABSTRACT

A press-molding material includes discontinuous reinforcing fibers having an average fiber length of 3 mm to 100 mm, and a thermoplastic resin as a matrix. The press-molding material has a certain reference plane; at least one standable plane; and at least one self-laminatable region. A portion of the standable plane is included in the self-laminatable region.

20 Claims, 15 Drawing Sheets

(51) Int. Cl.
*B29C 43/34* (2006.01)
*B29K 101/12* (2006.01)
*B29K 105/08* (2006.01)

(52) U.S. Cl.
CPC .. *B29K 2101/12* (2013.01); *B29K 2105/0872* (2013.01); *B32B 2260/046* (2013.01); *B32B 2262/106* (2013.01)

(58) Field of Classification Search
USPC .......................................................... 524/495
See application file for complete search history.

(56) References Cited

FOREIGN PATENT DOCUMENTS

| | | |
|---|---|---|
| JP | H10-100174 A | 4/1998 |
| JP | 2002-240068 A | 8/2002 |
| JP | 3572823 B2 | 10/2004 |
| JP | 2007-181935 A | 7/2007 |
| JP | 2010-535650 A | 11/2010 |

OTHER PUBLICATIONS

Jun. 26, 2018—(PCT/JP) International Preliminary Report on Patentability—App 2016/087960—Partial Eng Tran.
Nov. 27, 2018—(EP) Supplementary Search Report—App 16878700.0.
Dec. 6, 2018—(EP) Office Action—App 16878700.0.
Feb. 7, 2017—International Search Report—Intl App PCT/JP2016/087960.

* cited by examiner

4

4

9

4

PRESS-MOLDING MATERIAL INCLUDING DISCONTINUOUS REINFORCING FIBERS AND THERMOPLASTIC RESIN AS MATRIX, SHAPED PRODUCT THEREOF, AND MANUFACTURING METHOD FOR SAME

CROSS REFERENCE TO RELATED APPLICATIONS

This is a U.S. National Phase Application under 35 U.S.C. § 371 of International Application No. PCT/JP2016/087960, filed Dec. 20, 2016, which claims priority to Japanese Application No. 2015-254639, filed Dec. 25, 2015, the entire contents of each of which are incorporated herein by reference.

TECHNICAL FIELD

The present invention relates to a press-molding material including discontinuous reinforcing fibers and a thermoplastic resin as a matrix, a shaped product thereof, and a manufacturing method for the same.

BACKGROUND ART

In recent years, composite materials in which reinforcing fibers are held in a resin matrix have been used as structural materials in various fields from viewpoints such as being able to obtain both high strength and reduced weight. Among these, composite materials including reinforcing fibers and a thermoplastic resin as a matrix have attracted attention in terms of short molding time, ease of recycling, and the like. In particular, it is considered that a method for obtaining a shaped product having a desired shape by press-molding a molding material including discontinuous reinforcing fibers having a certain fiber length and a thermoplastic resin as a matrix makes it possible to obtain a shaped product with a three-dimensional shape and superior strength including reinforcing fibers with less breakage of the reinforcing fibers at the time of molding and a longer residual fiber length in comparison with injection molding or the like, which is particularly promising.

However, when a shaped product with a three-dimensional shape having irregularities or the like formed of a composite material including reinforced fibers and a thermoplastic resin as a matrix (hereinafter may be referred to as a fiber-reinforced thermoplastic or abbreviated as FRTP) is manufactured by press-molding, the obtained shaped product may be deteriorated in appearance due to the generation of wrinkles or the like. In response to such a problem, attempts have been made to obtain an FRTP shaped product having good appearance without the generation of wrinkles at the time of press-molding by making incisions in the molding material in advance.

For example, as a method for manufacturing a shaped product of a fiber-reinforced thermoplastic resin, PTL 1 illustrates a method in which a shaped product having a concavo-convex shape which is deep in parts is manufactured without generating wrinkles by using a fiber-reinforced thermoplastic resin sheet which is provided in advance with a cut at a position corresponding to a concavo-convex part of a metal mold molding surface, and carrying out clamping so as to fill the inside of the metal mold cavity while pushing out the sheet. However, in this method, since the sheet is divided at the cut portion, when press-molding this sheet, there is a concern that the resins will be aggregated and welded to each other and the strength of the portion will be decreased.

PTL 2 proposes a method for manufacturing a hemispherical shaped product without generating wrinkles by molding a partially separated piece separated by a notch from a molding material formed of a fiber-reinforced composite material into a three-dimensional shape by press-molding and then overlapping a part of the remainder by press-molding to form the entirety into a desired three-dimensional shape. However, PTL 2 only illustrates a shaped product of a fiber-reinforced composite material where the matrix resin is a thermosetting resin (epoxy resin). It is necessary to arrange a prepreg in a metal mold to carry out a shaping operation a plurality of times. It is clear that the method is difficult to apply to the manufacturing of a shaped product of a fiber-reinforced composite material where the matrix resin is a thermoplastic resin. Furthermore, the comparative examples of PTL 2 illustrate that it is not possible to obtain shaped products which do not have wrinkles and disarray in the reinforced fibers just by press-molding the entire cut prepreg without press-molding the partially separated piece and the remainder in a stepwise manner. It may be said that there is room for considerable improvement in the technique of PTL 2 in terms of productivity in that it is not possible to obtain a good product by a single-step press-molding.

PTL 3 illustrates that, when molding a housing formed of fiber reinforced plastic (may be abbreviated as FRP) having a corner by a press-molding method, it is possible to obtain an FRP housing without distortion or deformation at the corners with high production efficiency by making a side wall constituent portion of the prepreg forming a side wall portion of a housing longer than the side wall portion of the housing in a prepreg laid on a lower mold, and partially overlapping ends of the side wall constituent portion of the prepreg, the ends forming the corners and being adjacent to each other so as to be laid on the lower mold. However, as a specific aspect, PTL 3 only illustrates obtaining an FRP housing without distortion or deformation at the corners by using a composite material including an epoxy resin which is a thermosetting resin as a matrix resin and carbon fibers, and performing an operation of winding and arranging a unidirectionally arranged fiber prepreg on the outermost periphery of a side wall constituent portion of the prepreg to suppress opening of the corners at the time of molding and diffuse the distortion. In a case of molding a composite material in which the matrix resin is a thermoplastic resin, since it is necessary to perform the molding by heating the composite material into a softened state, it is considered that it is extremely difficult to obtain an FRTP by the method of PTL 3 in which it is necessary to wind and arrange a unidirectionally arranged fiber prepreg on the outermost periphery of the side wall constituent portion.

CITATION LIST

Patent Literature

[PTL 1] Japanese Patent No. 3572823
[PTL 2] JP-A-2002-240068
[PTL 3] JP-A-2007-181935

SUMMARY OF INVENTION

Technical Problem

The present invention was made in order to solve the problems of the related art described above. The present invention has a specific object of providing a press-molding material with which it is possible to obtain a shaped product with an excellent appearance and strength without weld lines at the corners or indentations of the shaped product in a method for manufacturing a shaped product having a three-dimensional shape of a fiber reinforced composite material including discontinuous reinforcing fibers and a thermoplastic resin as a matrix by press-molding; a shaped product; and a method for manufacturing the molding material and the shaped product.

Solution to Problem

The present invention provides a press-molding material including discontinuous reinforcing fibers having an average fiber length of 3 mm to 100 mm, and a thermoplastic resin as a matrix, the press-molding material having a certain reference plane, at least one standable plane, and at least one self-laminatable region, in which a portion of the standable plane is included in the self-laminatable region.

Furthermore, the present invention provides a shaped product of a composite material, the composite material including discontinuous reinforcing fibers having an average fiber length of 3 mm to 100 mm, and a thermoplastic resin as a matrix, the shaped product having a three-dimensional shape having a certain reference plane, and one or more standing planes, in which the composite material forms a self-laminated structure in at least at one location in a boundary region between the certain reference plane and the standing planes, there are no weld lines at any ridgeline where the reference plane and the standable planes are in contact with each other.

Furthermore, the present invention provides a method for manufacturing the shaped product described above, in which, using a metal mold having an upper mold and a lower mold in which a molding cavity is formed by clamping the upper mold and the lower mold, a press-molding material including discontinuous reinforcing fibers having an average fiber length of 3 mm to 100 mm and a thermoplastic resin as a matrix and having a certain reference plane, at least one standable plane, and at least one self-laminatable region, in which a portion of the standable planes is included in the self-laminatable regions, is arranged in the metal mold and subjected to press-molding.

Furthermore, the present invention provides a method for manufacturing the press-molding material described above, including a step of processing an object formed of a composite material including discontinuous reinforcing fibers having an average fiber length of 3 mm to 100 mm and a thermoplastic resin as a matrix to form a press-molding material with a shape satisfying i) and ii) below i) The shape is obtained by developing a three-dimensional shape of a shaped product which is a target for press-molding, the three-dimensional shape of the shaped product being subjected to inverse analysis of molding process and developed by a computer.

ii) The shape is obtained by developing the three-dimensional shape of a shaped product which is a target for press-molding, the three-dimensional shape from which at least one element is removed during the inverse molding analysis.

Advantageous Effects of Invention

The press-molding material of the present invention is arranged into a shape extremely close to the shape of a desired shaped product with respect to a metal mold molding surface such that, in a certain reference plane or a standable plane, portions of the certain reference plane and the standable plane overlap at least one location, and subjected to press-molding, which makes it possible to obtain a shaped product of a composite material with no wrinkles or the like even in a three-dimensional shape, with an excellent appearance, and with excellent strength without weld lines at corners or the like.

Press-molding the press-molding material of the present invention makes it possible to obtain a shaped product of a composite material including reinforcing fibers having an average fiber length as long as 3 to 100 mm, which is difficult to obtain by injection molding. The method of manufacturing a shaped product of a composite material by press-molding the press-molding material of the present invention has extremely high productivity in comparison with a manufacturing method using a molding material including reinforcing fibers of a fabric or a molding material in which a matrix resin is a thermosetting resin.

When the press-molding material of the present invention is used for so-called cold press-molding, even with a complicated three-dimensional shaped product, it is possible to efficiently produce a shaped product without wrinkles or the like with an excellent appearance, and with excellent strength with no weld lines at corners or portions with a complicated shape.

BRIEF DESCRIPTION OF DRAWINGS

FIG. 11 is a schematic view showing a shape of a press-molding material having two adjacent self-laminatable regions used in Examples 8 to 23 in a thickness direction thereof in the same manner as shown in FIG. 10 along with a distance c between a midpoint of a straight line connecting ends of the portions facing each other on the circumferences of the two self-laminatable regions and a joining portion, and the like.

DESCRIPTION OF EMBODIMENTS

[Press-Molding Material]

Figure 1A:
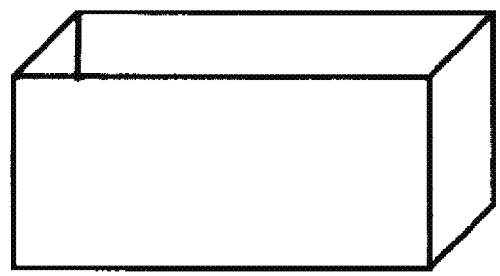
FIG. 1A is a schematic view showing an example of a shape of a shaped product according to an embodiment of the present invention.

The present invention is a press-molding material including discontinuous reinforcing fibers having an average fiber length of 3 mm to 100 mm, and a thermoplastic resin as a matrix, and having a certain reference plane, at least one standable plane, and at least one self-laminatable region, in which a portion of the standable plane is included in the self-laminatable region.

A description will be given below of the present invention with reference to the drawings as appropriate, but the present invention is not limited to the embodiments shown in the drawings.

The press-molding material of the present invention is bent at a certain portion thereof, arranged in a metal mold, and subjected to press-molding to make it possible to obtain a shaped product having a shape in which a certain surface and another, separate surface have a positional relationship of not being on the same plane in the coordinate system via corners, curved portions, or the like. The standable plane of the press-molding material of the present invention is a portion which may be bent when arranged in a metal mold and the reference plane may be described as a portion which does not bend in the same manner when the reference plane is in contact with the standable plane and the standable plane is bent. The reference plane and the standable plane of the press-molding material are appropriately determined according to the shape of the desired shaped product or the method or the metal mold of the press-molding.

Figure 1B:
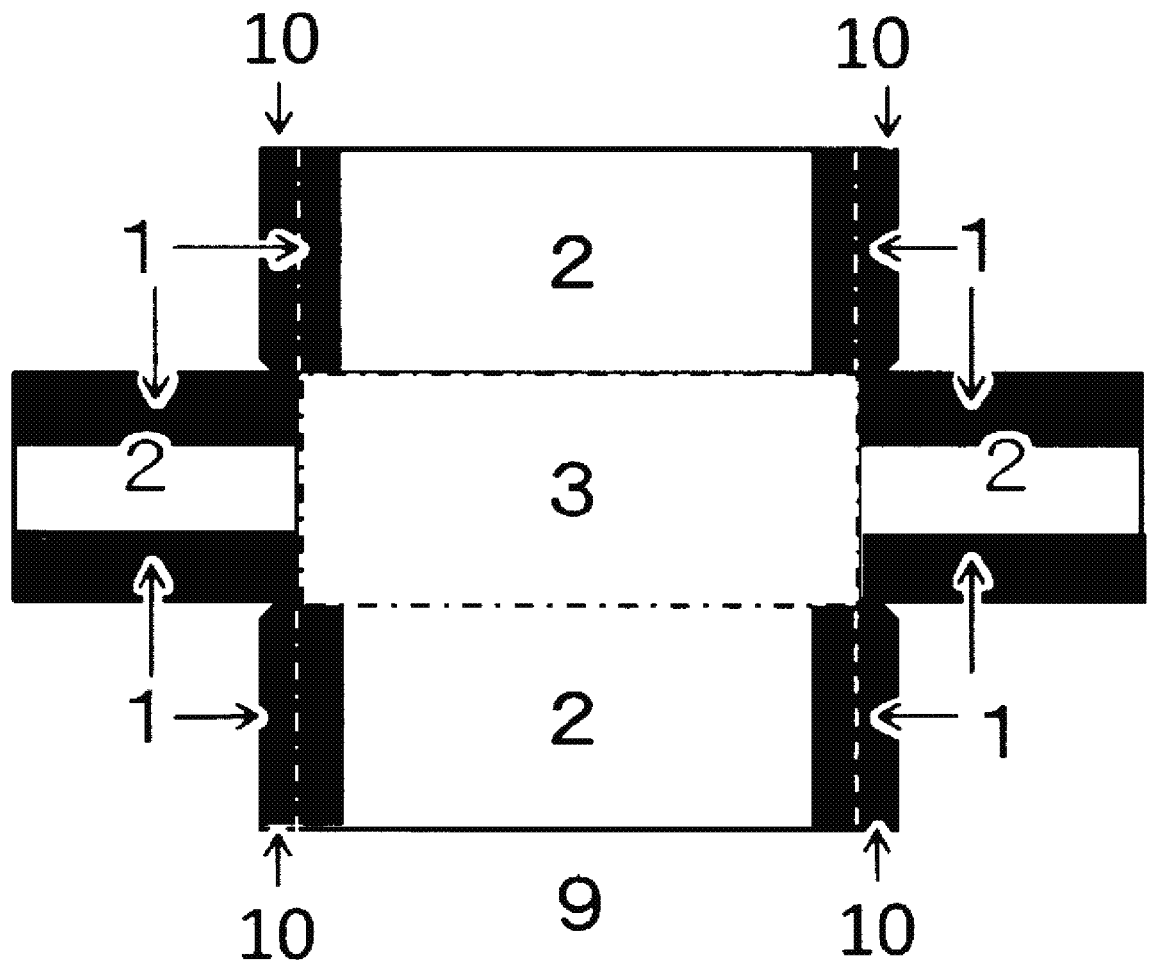
FIG. 1B is a schematic view showing an example of a shape of a press-molding material according to an embodiment of the present invention.

The reference plane of the press-molding material of the present invention is able to be press molded to become a comparatively wide surface such as the bottom surface of the shaped product, as shown by reference numeral 3 in FIG. 1B.

The press-molding material of the present invention has at least one standable plane, and preferably has a plurality of standable planes. There are no particular limitations on the number of standable planes of the press-molding material, but if an upper limit is provided, 10 or less is preferable to be applicable to most applications, and 5 or less is more preferable to have a simple shape. The press-molding may be performed by not only bending the standable plane of the press-molding material with respect to the reference plane, but by also further bending a portion of the standable plane to arrange the press-molding material in the metal mold.

As shown by reference numeral 2 in FIG. 1B, the standable plane of the press-molding material of the present invention is able to be press molded to become a standing plane of a shaped product, for example, a portion such as a side surface in a case of a shaped product with a rib or a box shape.

Figure 9A:
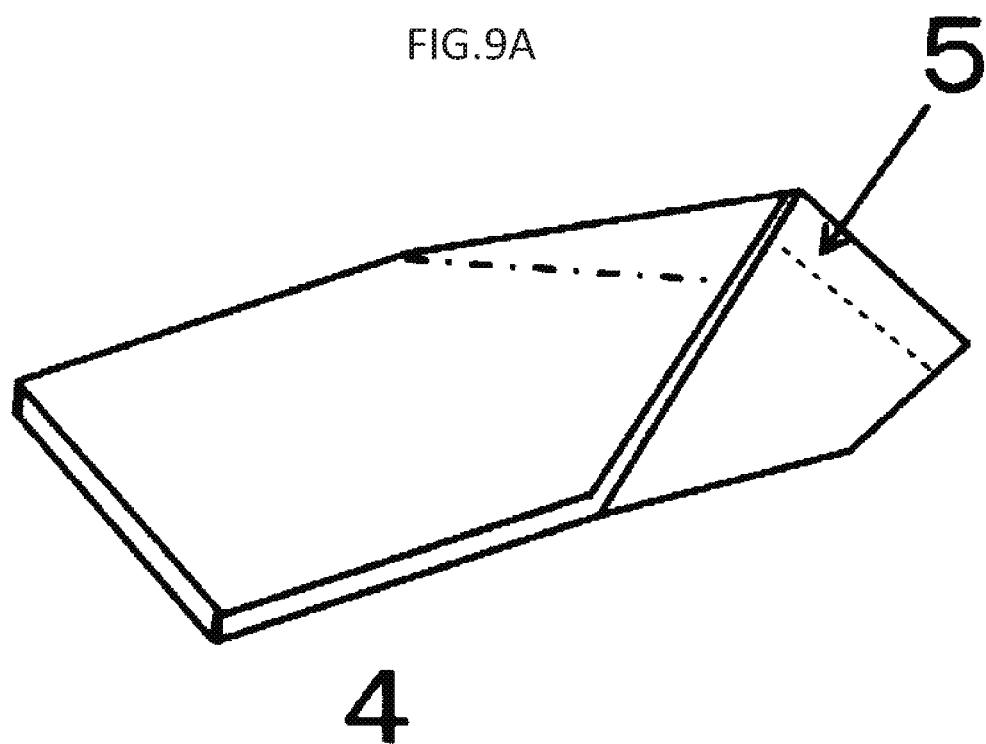
FIG. 9A is a schematic view showing an example of a shape of a shaped product according to an embodiment of the present invention.
Figure 9B:
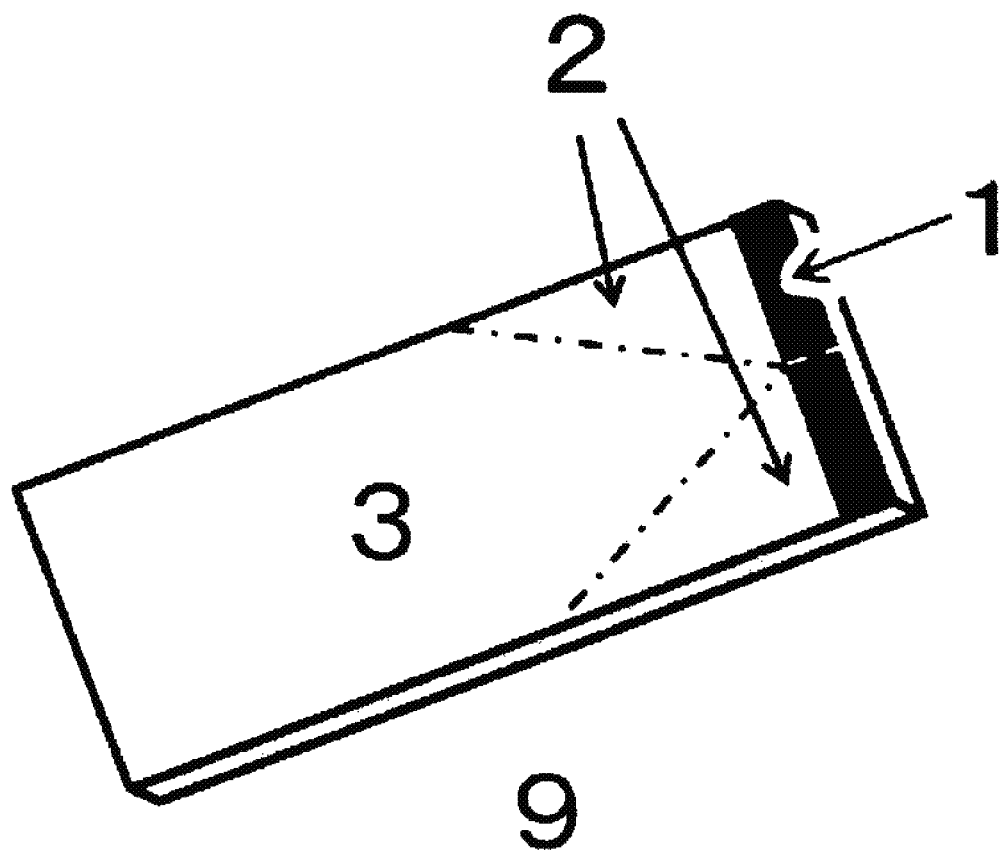
FIG. 9B is a schematic view showing an example of a shape of a press-molding material according to an embodiment of the present invention.

The press-molding material of the present invention has at least one self-laminatable region and may have a plurality of self-laminatable regions. There are no particular limitations on the number of self-laminatable regions of the press-molding material, but if an upper limit is provided, 20 or less is preferable to be applicable to most applications, and 10 or less is more preferable to have a simple shape. The self-laminatable region of the present invention refers to one portion of the press-molding material and another portion, which form a laminated structure in a shaped product when the press-molding material is bent at a certain portion and arranged in a metal mold to carry out press-molding. However, as shown in FIG. 9B, the present invention also encompasses an aspect in which a laminated structure is formed in one self-laminatable region. In these drawings of examples of the press-molding material of the present invention, for the sake of convenience, the self-laminatable region is shown as a location surrounded by a straight line, but may of course be a region which has a curved or irregular peripheral shape.

In the present invention, rather than just a region (hereinafter may be referred to as a preliminary laminating region) in which it is possible for portions of the press-molding material to overlap when the press-molding material is bent at a certain portion and arranged in a metal mold, the self-laminatable region may also include a region in which a press-molding material is pressed in a heated and plastic state and made to flow to make a laminated structure at a portion wider than the preliminary laminating region. Such an aspect is shown in FIG. 1B and the like. In these drawings which are examples of the press-molding material of the present invention, reference numeral 10 represents a preliminary laminating region, and the dashed lines represent folding lines. Naturally, the press-molding material may be equivalent to the self-laminatable region and the preliminary laminating region.

Figure 2A:
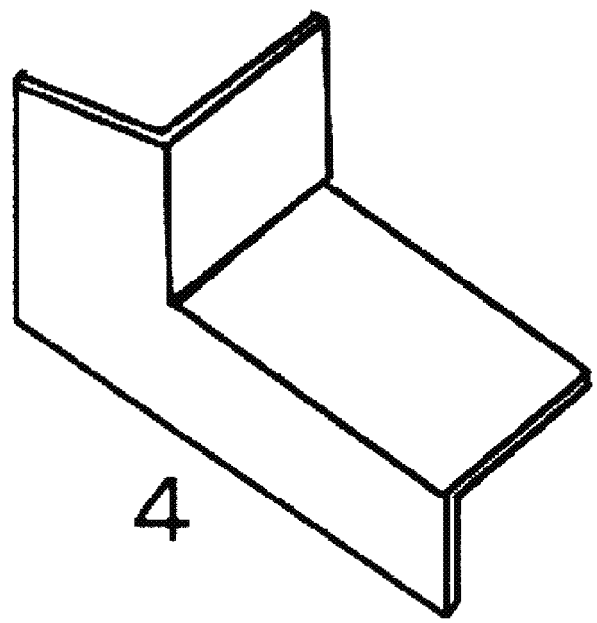
FIG. 2A is a schematic view showing an example of a shape of a shaped product according to an embodiment of the present invention.
Figure 2B:
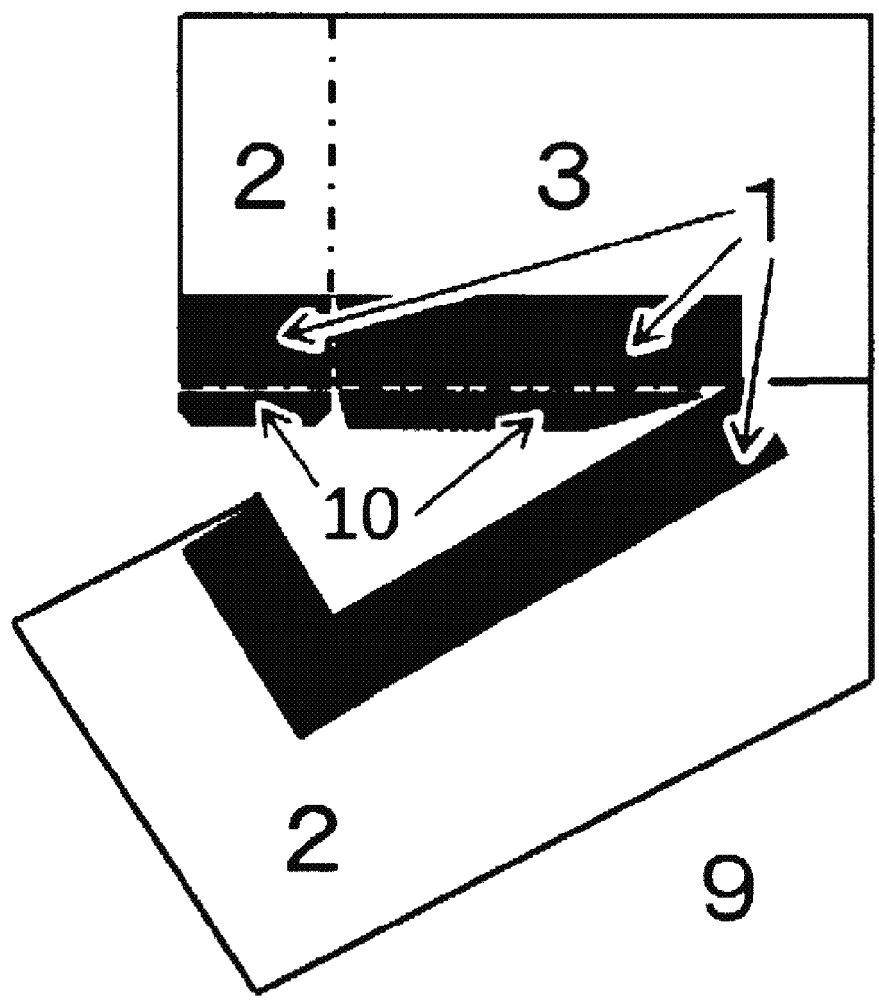
FIG. 2B is a schematic view showing an example of a shape of a press-molding material according to an embodiment of the present invention.
Figure 3A:
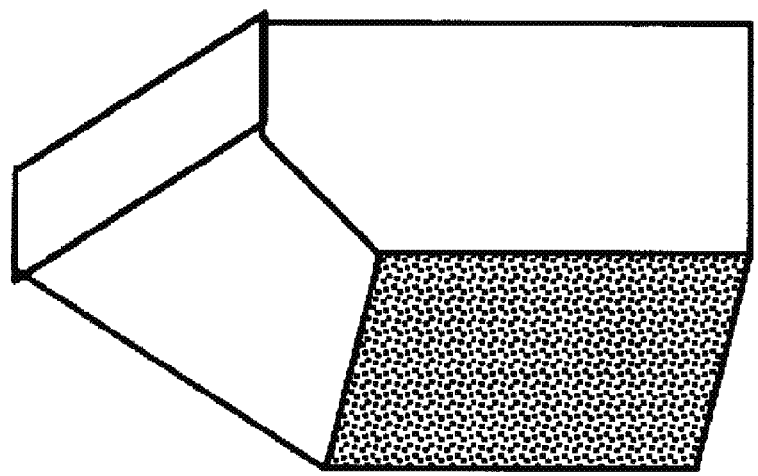
FIG. 3A is a schematic view showing an example of a shape of a shaped product according to an embodiment of the present invention.
Figure 3B:
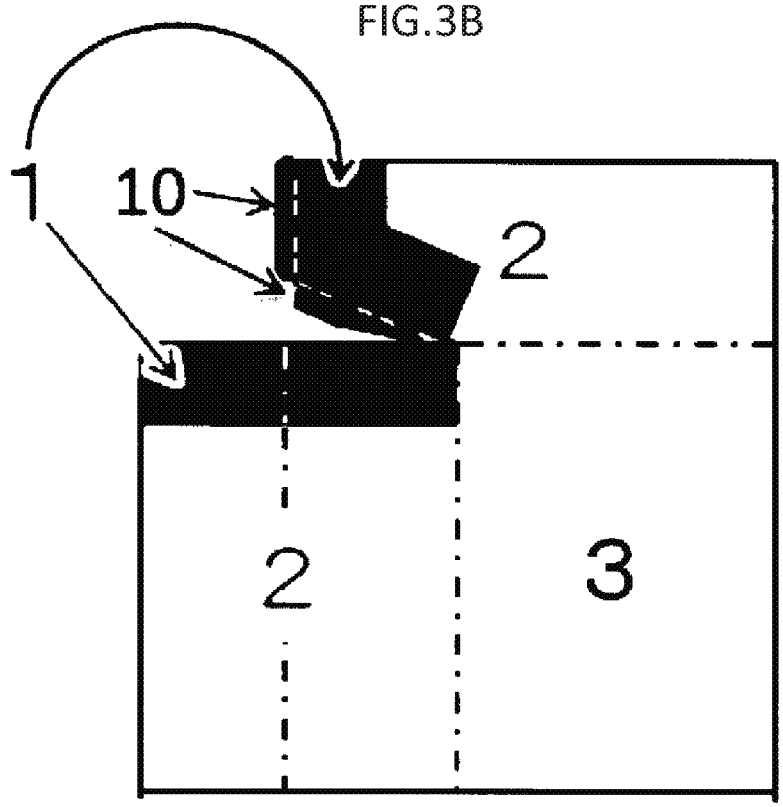
FIG. 3B is a schematic view showing an example of a shape of a press-molding material according to an embodiment of the present invention.
Figure 4A:
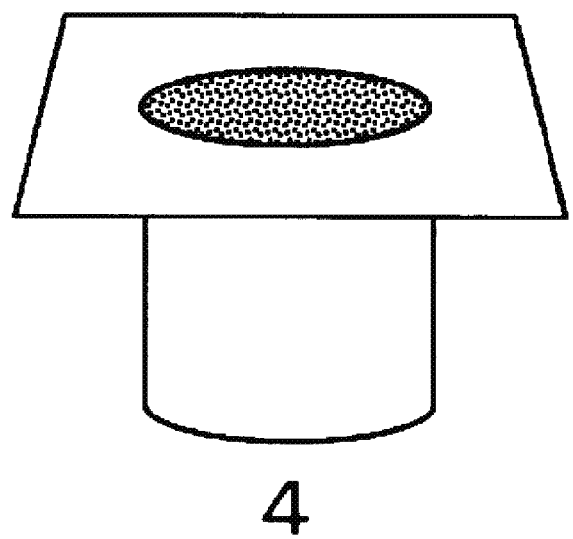
FIG. 4A is a schematic view showing an example of a shape of a shaped product according to an embodiment of the present invention.
Figure 4B:
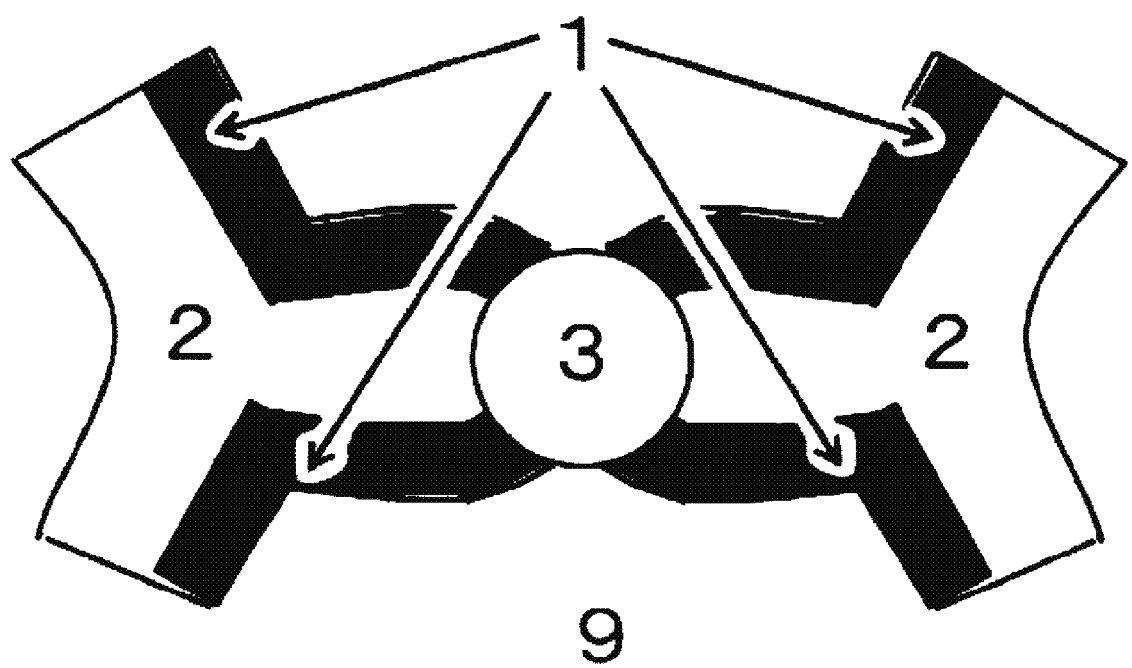
FIG. 4B is a schematic view showing an example of a shape of a press-molding material according to an embodiment of the present invention.

The press-molding material of the present invention has a plurality of standable planes and has a plurality of self-laminatable regions, and at least one location in the plurality of self-laminatable regions preferably includes a portion of each of the plurality of standable planes or includes each of a portion of the standable plane and a portion of the reference plane. In FIG. 1B, self-laminatable regions including a portion of each of the plurality of standable planes are shown. In FIG. 2B, self-laminatable regions including a portion of the standable plane and a portion of the reference plane is shown. When the press-molding material has at least one pair of two adjacent self-laminatable regions as shown by reference numeral 1 in FIG. 1B, it is easy to laminate the regions to each other at the time of press-molding and it is possible to quickly arrange the press-molding material in the metal mold, which is preferable. To express this more clearly, the press-molding material preferably has two adjacent self-laminatable regions which are able to be laminated to each other.

Figure 13:
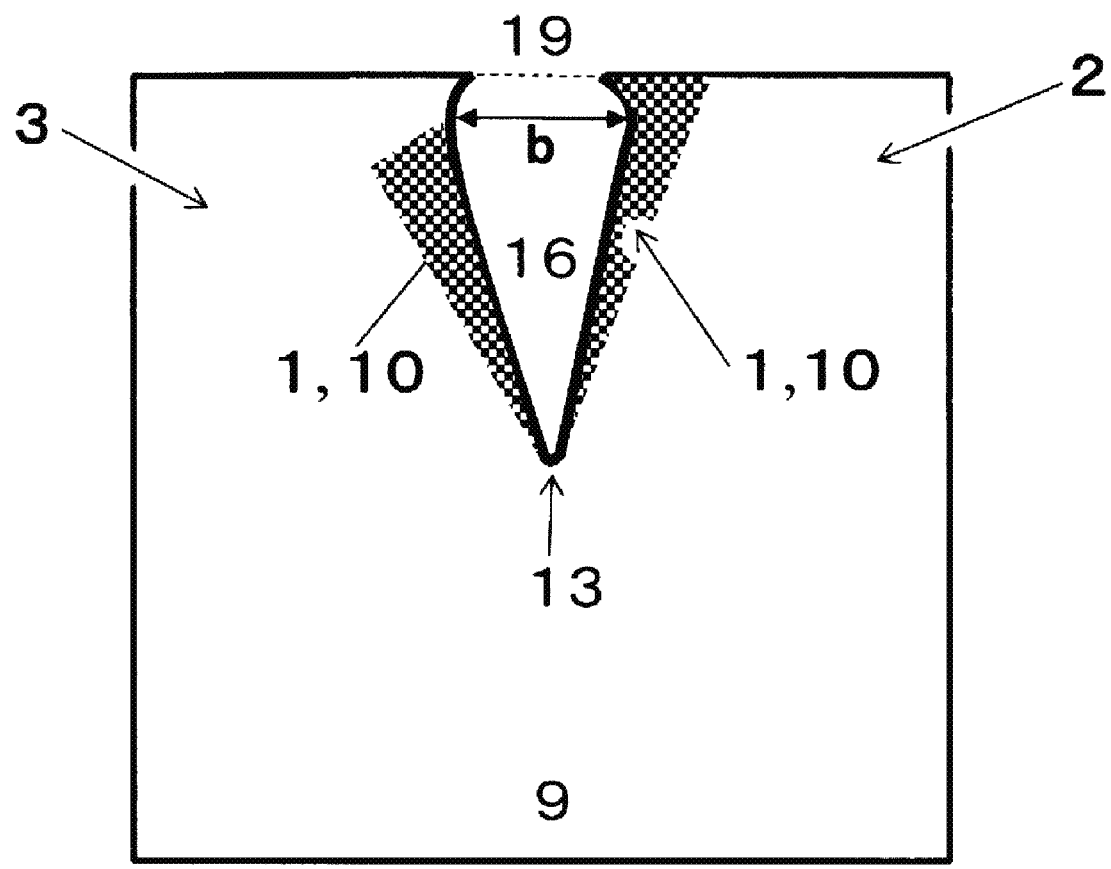
FIG. 13 is a schematic view showing the shape in the thickness direction of an example of a press-molding material having two adjacent self-laminatable regions, in which the greatest distance b between the self-laminatable regions is not the distance between end portions of the circumferences of the self-laminatable regions, the circumferences facing each other.

When the press-molding material has two adjacent self-laminatable regions and the greatest distance b between the two adjacent self-laminatable regions (may be abbreviated as the greatest distance b, or as the distance b) is 500 mm or less, wrinkles are less likely to occur when carrying out press-molding on the press-molding material, which is preferable. The greatest distance b between the self-laminatable regions is more preferably 400 mm or less, and even more preferably 300 mm or less. The greatest distance b between the self-laminatable regions described above may also be expressed by a different expression as follows: when a press-molding material having two adjacent self-laminatable regions exhibits a substantially concave shape in which a bay-shaped space region is formed by two adjacent self-laminatable regions in a shape projected in the thickness direction of the press-molding material, among the distances in connecting straight lines between the two circumferences of the self-laminatable regions facing each other with the bay-shaped space region therebetween, the connecting straight lines being substantially parallel to a straight line connecting the ends of the circumferences of the two self-laminatable regions on the mouth portion side of the bay-shaped space region (hereinafter the straight line may be referred to as the bay mouth end straight line), it is more preferable that the greatest distance b is 500 mm or less for the reasons described above. Naturally, the straight line substantially parallel to the bay mouth end straight line may be completely parallel to the bay mouth end straight line or may be the bay mouth end straight line itself. FIG. 13 shows the shape in the case of a press-molding material where the greatest distance b is located inside the bay-shaped space region slightly in from the bay mouth end straight line, seen in the thickness direction thereof. More preferable values of the distance b are as described above.

Which of the dimensions in the x-, y-, and z-directions of the press-molding material is to be set as the width, the depth, and the thickness may be appropriately set, but in many cases the smallest dimension is the thickness, the largest dimension is the width, the remaining direction is set as the depth. For a press-molding material having a complicated shape such that the dimension in each direction varies depending on the site, the average values or the maximum values of each dimension may be compared with each other and set as the thickness, the depth, and the width. It is also possible to apply the method of setting the width, the depth, and the thickness for this press-molding material to a shaped product.

When the press-molding material has two adjacent self-laminatable regions and has a shape with a curvature radius R of 0 mm or more and less than 5 mm at the joining portions of the circumferences of the self-laminatable regions, wrinkles are less likely to occur when these self-laminatable regions are laminated when carrying out press-molding on the press-molding material, which is preferable. The curvature radius is more preferably more than 0 mm, and even more preferably more than 0 mm and 4 mm or less. The above curvature radius R may also be expressed by a different expression as follows: for the reasons described above, it is more preferable when a press-molding material having two adjacent self-laminatable regions exhibits a substantially concave shape in which a bay-shaped space region is formed by two adjacent self-laminatable regions in a shape projected in the thickness direction thereof, and has a shape with a curvature radius R of 0 mm or more and less than 5 mm at joining portions of two circumferences of the self-laminatable regions facing each other with the bay-shaped space region therebetween.

Figure 14:
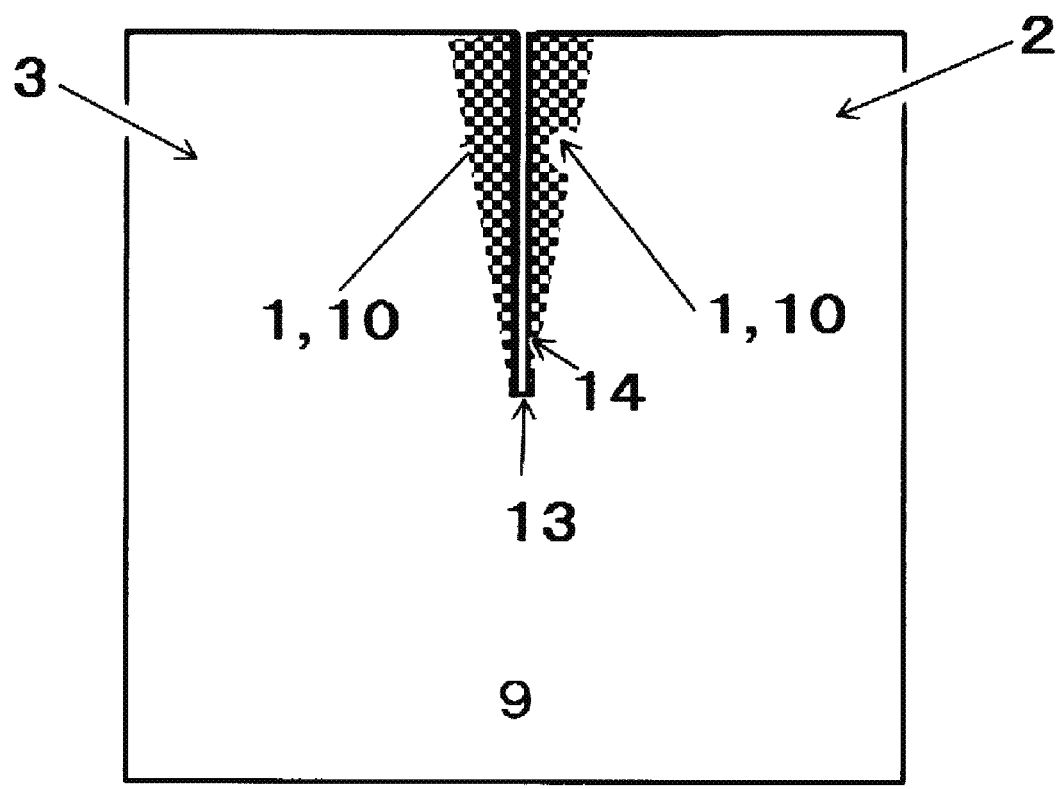
FIG. 14 is a schematic view showing an example of a press-molding material having two adjacent self-laminatable regions, in which a bay-shaped space region has a linear shape, together with a joining portion.

As a shape where the curvature radius is less than 0 mm, it is possible to show a shape of a joining portion in a case where a bay-shaped space region has a linear shape, which is shown in FIG. 14.

Figure 15:
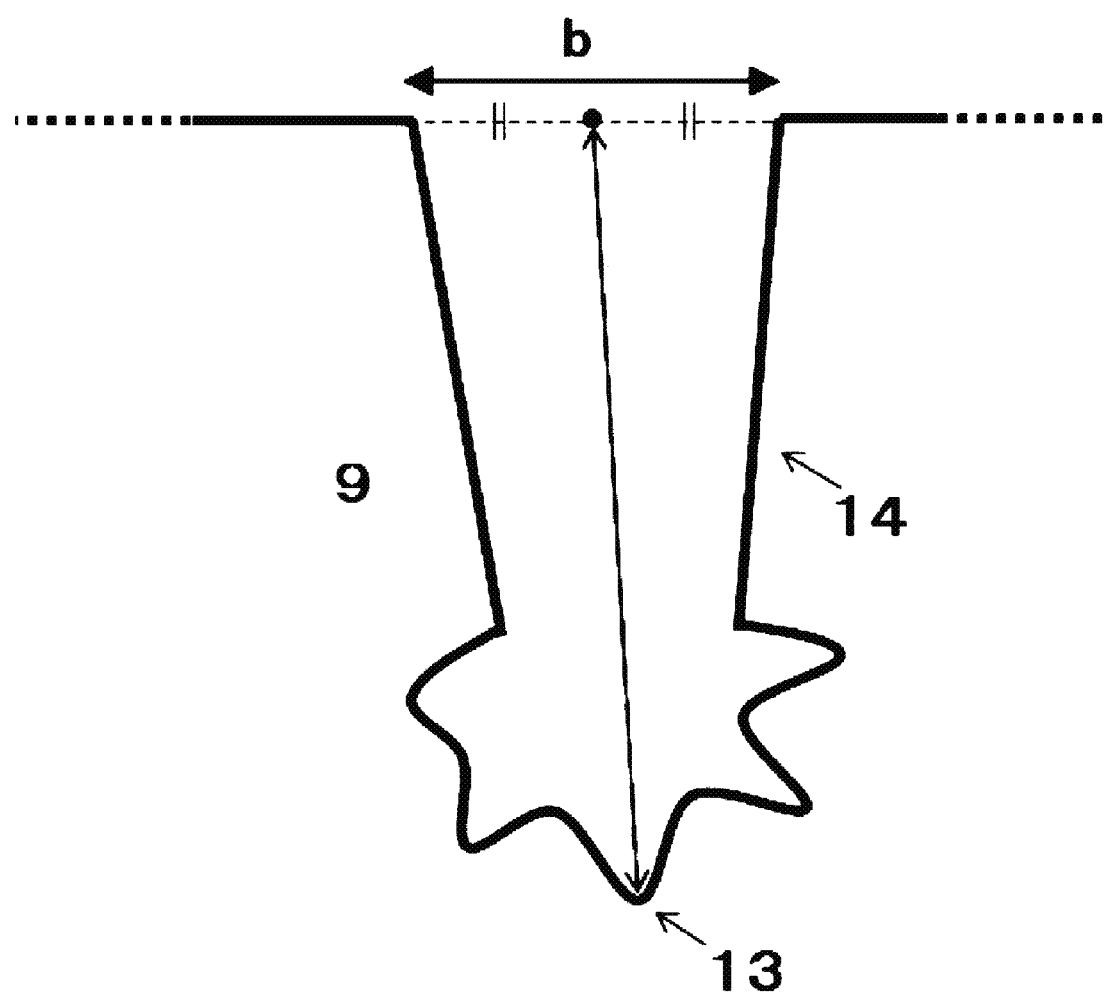
FIG. 15 is a schematic view showing an example of a shape of a bay-shaped space region of a press-molding material having two adjacent self-laminatable regions together with a joining portion. However, display of the self-laminatable regions is omitted.

As shown in FIG. 15, it is also possible to preferably define the joining portion of the circumferences as a peripheral site including the farthest point from the midpoint of a straight line connecting each end of the two circumferences of the self-laminatable regions on the mouth portion side of the bay-shaped void region, among points on the circumferences, the points being able to be connected to the midpoint with a straight line. In a case of a plurality of farthest points, it is preferable that a joining portion, which is a peripheral site including any one point, has a shape with the curvature radius R, and it is more preferable that a joining portion, which is each peripheral site including each of a plurality of farthest points, has a shape with the curvature radius R.

When the press-molding material has two adjacent self-laminatable regions and the thickness of at least one self-laminatable region has a thickness of less than 5.5 mm, wrinkles are less likely to occur even when these self-laminatable regions are laminated when carrying out press-molding, which is preferable. The thickness of the self-laminatable region is more preferably less than 5.0 mm, even more preferably less than 4.0, and even more preferably less than 3.5 mm. The lower limit of the thickness of the self-laminatable region is naturally more than 0 mm, preferably 0.1 mm or more, more preferably 0.5 mm or more, and even more preferably 1.0 mm or more. It is possible to appropriately select the preferable numerical range of the thickness of the self-laminatable region from the preferable lower limit values and upper limit values described above. The thickness of the two adjacent self-laminatable regions of the press-molding material is not limited as long as any one of the thicknesses falls within the preferable range described above, but it is more preferable that both are in the preferable ranges described above.

When the press-molding material has two adjacent self-laminatable regions, in which the thickness of at least one self-laminatable region is less than 4.0 mm, and has a shape with the curvature radius R of 0 mm or more and less than 5 mm at a joining portion of the circumferences of the self-laminatable regions, wrinkles are less likely to occur when press-molding is carried out on the press-molding material, which is preferable. With respect to the thickness of the self-laminatable region and the curvature radius R, expressions other than as described above are also possible and the same applies to more preferable numerical ranges and aspects thereof.

When the press-molding material has two adjacent self-laminatable regions, in which the thickness of at least one self-laminatable region is 4.0 mm or more and less than 5.5 mm, and has a shape with the curvature radius R of 1 mm or more and less than 5 mm at a joining portion of the circumferences of the self-laminatable regions, wrinkles are less likely to occur when press-molding is carried out on the press-molding material, which is preferable. With respect to the thickness of the self-laminatable region and the curvature radius R, expressions other than as described above are also possible and the same applies to more preferable numerical ranges and aspects thereof.

When the press-molding material has two adjacent self-laminatable regions and has a shape with a curvature radius R of 0 mm or more and less than 5 mm at the joining portions of the circumferences of the self-laminatable regions, and a total length L of portions in which the two circumferences of the self-laminatable regions face each other (which may be simply referred to as the total length L) and a distance c between the midpoint of the straight line connecting the ends of the portions in which the two circumferences of the self-laminatable regions face each other and the joining portion (which may be simply referred to as the distance c) satisfy Expression (q):

$$L/c \geq 1.5 \text{ (here, the units of } L \text{ and } c \text{ are the same)} \quad \text{(q)}$$

the press-molding material is press molded to obtain a shaped product in which the strength of sites formed by self-lamination of the press-molding material at the time of press-molding is excellent, which is preferable.

The above aspect may also be expressed by a different expression as follows: when a press-molding material having two adjacent self-laminatable regions exhibits a substantially concave shape in which a bay-shaped space region is formed by two adjacent self-laminatable regions in a shape projected in the thickness direction thereof and has a shape with the curvature radius R of 0 mm or more and less than 5 mm at the joining portion of the two circumferences of the self-laminatable regions facing each other with the bay-shaped space region therebetween, it is more preferable that the total length L of the portions in which the two circumferences of the self-laminatable regions face the bay-shaped space region and the distance c between the joining portion and the midpoint of the straight line connecting each end of the circumferences of the self-laminatable regions on the mouth side of the bay-shaped space region satisfy Expression (q) for the reasons described above.

For the press-molding material, L/c in the left side of Expression (q) described above is more preferably 1.8 or more, and even more preferably 2.0 or more.

The total length L is illustrated by reference numeral 14 (a portion indicated by a bold line) in FIG. 10.

It is possible to obtain the press-molding material of the present invention based on a paper-type sheet formed of discontinuous fibers described in Pamphlet of International Publication No. 2007/097436, or a random mat or a fiber-reinforced composite material or the like (may be abbreviated below as a base material or the like) described in U.S. Pat. Nos. 8,829,103, 9,193,840, U.S. Pat. Pub. No. 2015/292145, Pamphlet of International Publication No. 2012/105080, and Pamphlet of International Publication No. 2013/031860, or the like. As the press-molding material of the present invention, the base material and the like described in the above documents may be obtained with a shape having a reference plane and a standable plane in the manufacturing in the description of the documents, or a general rectangular plate-like material of the base material or the like described in these documents may be cut into or cut out as a blank shape having a reference plane and a standable plane.

Although the thickness of the press-molding material of the present invention is not particularly limited, usually, the thickness is preferably in the range of 0.01 mm to 100 mm, more preferably in the range of 0.01 mm to 30 mm, even more preferably in the range of 0.01 mm to 5 mm, and yet more preferably in the range of 1 mm to 3 mm. The thickness of the press-molding material may be the same at all sites or may differ depending on the site. A press-molding material in which a preferable thickness of the self-laminatable region is within the above range, and the thickness of the other sites is within the above range is also preferable. Here, in a case where the molding material of the present invention has a configuration in which a plurality of layers are laminated, the above thickness does not refer to the thickness of each layer, but refers to the entire thickness of the composite material obtained by totaling the thicknesses of each layer.

The press-molding material used in the present invention may have a single layer structure formed of a single layer or may have a laminated structure in which a plurality of layers are laminated. An aspect in which the press-molding material has a laminated structure may be an aspect in which a plurality of layers having the same composition are laminated or may be an aspect in which a plurality of layers having compositions different from each other are laminated. In addition, an aspect in which the composite material has the laminated structure described above may be an aspect in which layers in which the reinforcing fiber arrangement states are different from each other are laminated. Examples of such an aspect include an aspect in which a layer in which reinforcing fibers are unidirectionally arranged and a layer in which reinforcing fibers are two-dimensionally randomly arranged are laminated. In a case where three or more layers are laminated, a sandwich structure formed of an arbitrary core layer and skin layers laminated on the front and back surfaces of the core layer may be adopted.

In the press-molding material of the present invention, the tensile elongation at break $\varepsilon v$ is preferably 105% to 400%, more preferably 105% to 260%, and even more preferably 110% to 230%. A press-molding material having a tensile elongation at break $\varepsilon v$ of 105% or more is preferable because the material is not easily torn even when bent or the like when arranged in a metal mold. A press-molding material having a tensile elongation at break $\varepsilon v$ of 400% or less is preferable because the material does not easily sag due to its own weight to be remarkably deformed when the material in a plastic state is transported by being grabbed by a robot arm or the like.

Here, the tensile elongation at break εv of the press-molding material is the stretching of the press-molding material when lengthened at a tensile rate of 20 mm/sec at a temperature equal to or higher than the softening temperature of the thermoplastic resin as the matrix of the press-molding material, and is represented by the following expression (e).

$$\varepsilon v = \text{length after lengthening of the molding material}/\text{length before lengthening of the molding material} \quad (e)$$

More specifically, the press-molding material is heated to a temperature equal to or higher than the softening temperature of the thermoplastic resin as the matrix, the press-molding material is arranged on a pressing mold for measuring the tensile elongation at break εv, and the mold is closed until the forming material is broken at a pressing mold clamping rate of 20 mm/sec, then the press-molding material is taken out, the lengthened length of the press-molding material is measured, and the tensile elongation at break εv is calculated by dividing the result by the length of the press-molding material before lengthening.

The temperature equal to or higher than the softening temperature of the thermoplastic resin as the matrix of the press-molding material is a temperature at which it is possible to carry out cold press-molding of the press-molding material. The temperature equal to or higher than the softening temperature of the thermoplastic resin is preferably the softening point temperature to the softening point temperature+100° C., and more preferably the softening point temperature+20° C. to the softening point temperature+80° C. In the present invention, the softening temperature of the thermoplastic resin as a matrix may be the melting point in a case where the thermoplastic resin is crystalline, or may be the glass transition temperature in a case where the thermoplastic resin is amorphous. For example, in a case where the thermoplastic resin as the matrix is crystalline polyamide 6 (also referred to as PA 6, nylon 6, Ny 6, or the like, melting point approximately 225° C.), the temperature equal to or higher than the softening point temperature is preferably 300° C.

The tensile elongation at break εv is influenced by the content of reinforcing fibers in the press-molding material, the fiber length, the fiber diameter, and the like. The larger the content of the reinforcing fiber, the longer the fiber length, and the smaller the fiber diameter, the smaller the tensile elongation at break εv tends to be. In a case where a flat fiber reinforced composite material is cut out to obtain a press-molding material or a case where the press-molding material is cut into a press-molding material of another shape, it is possible to regard the tensile elongation at break εv of a flat fiber reinforced composite material or the like before cutting and the press-molding material after cutting as the same.

The discontinuous reinforcing fibers and the thermoplastic resin as the matrix included in the press-molding material of the present invention, the composition and form of the constituent components, and the method for manufacturing the press-molding material are described below.

[Method for Producing Press-Molding Material]

As a method for producing the press-molding material of the present invention, a manufacturing method including a step in which an object formed of a composite material including discontinuous reinforcing fibers having an average fiber length of 3 to 100 mm and a thermoplastic resin as a matrix is processed so as to be a shape satisfying i) and ii) below, which may be referred to as a blank shape, is preferable.

i) The shape is obtained by developing a three-dimensional shape of a shaped product which is a target for press-molding, the shaped product being subjected to inverse analysis of molding process and developed by a computer.

ii) The shape is obtained by developing a three-dimensional shape of a shaped product which is a target for press-molding, the three-dimensional shape from which at least one element is removed during the inverse molding analysis.

Here, examples of the substance formed of a composite material including a thermoplastic resin as a matrix include the above base material and the like.

Here, the "inverse molding analysis" is a method of predicting the shape and size of the molding material necessary for manufacturing the shaped product by press-molding from the desired shaped product shape data using the finite element method. As the shape of the molding material is referred to as a blank shape in the above description, the molding material in the present invention may be referred to as a blank.

Figure 8A:
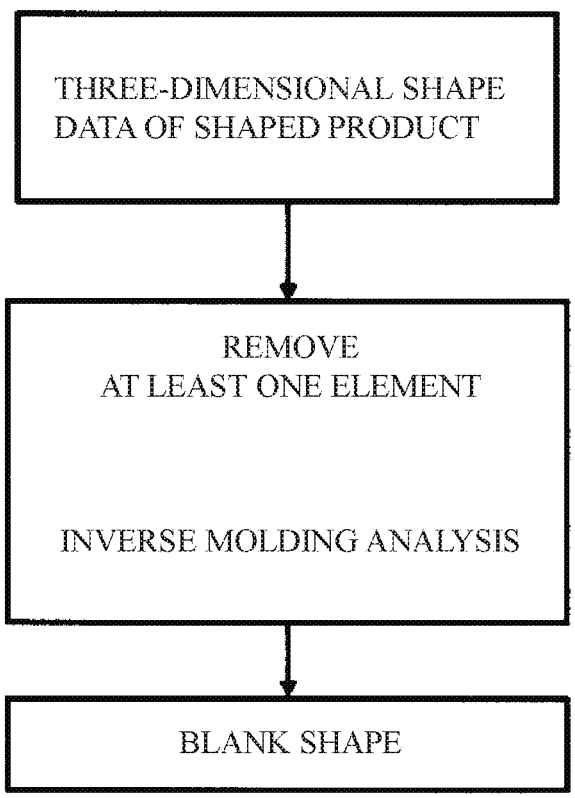
FIG. 8A is a schematic view showing processing steps for deriving a blank shape.
Figure 8B:
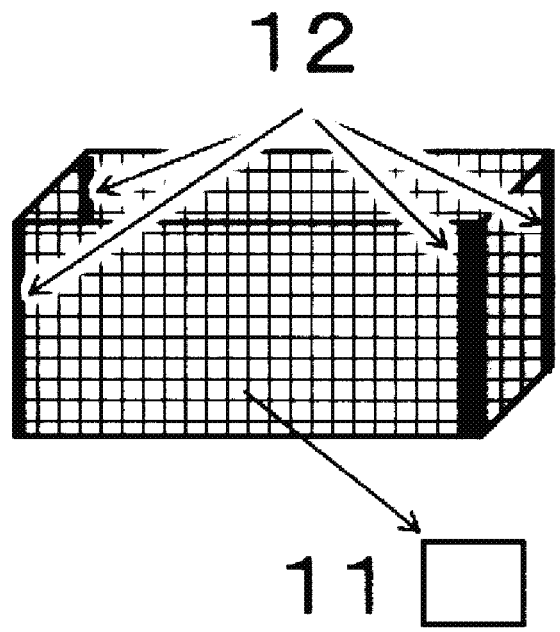
FIG. 8B is a schematic view in which one of the elements of the three-dimensional shape of the shaped product as the object is removed during inverse analysis of molding process.

Here, the "elements" are also called a mesh and refer to each one of a number of structures to be analyzed which are finitely divided in order to perform numerical analysis by the finite element method. For example, reference numeral 11 in FIG. 8B represents one element. "Remove at least one" means to remove at least one element included in the laminatable portion among the elements forming the structure. By doing so, a blank which is subjected to inverse analysis of molding process and developed by a computer naturally has a shape with the shape of the laminatable portion. For example, as illustrated in FIG. 8B, removing the elements (reference numeral 12) included in the laminatable portion among the elements 11 and performing inverse analysis of molding process makes it possible to obtain a blank shape as shown in FIG. 1B. The laminatable portion described above is a site which becomes a self-laminatable region in a blank shape developed by inverse molding analysis.

[Shaped Product]

The present invention encompasses the invention of a shaped product of a composite material including discontinuous reinforcing fibers having an average fiber length of 3 mm to 100 mm, and a thermoplastic resin as a matrix, the shaped product having a certain reference plane, and one or more standing planes, in which the composite material forms a self-laminated structure in at least at one location in a boundary region between the planes, and there is no weld line at any ridgeline where the reference plane and the standing plane are in contact, and the shaped product has a three-dimensional shape. Examples of such a shaped product are shown in FIG. 1A, FIG. 2A, FIG. 3A, FIG. 4A, and FIG. 5A to FIG. 5C. Here, the shaped product of the present invention "having a certain reference plane, and one or more standing planes, in which the composite material forms a self-laminated structure in at least at one location in a boundary region between these planes" also encompasses a shaped product having a reference plane and two or more standing planes, in which the composite material forms a self-laminated structure in at least at one location in a boundary region between the two or more standing planes, and no self-laminated structure is formed at all in the boundary region between the reference plane and the standing planes. The shaped product of the present invention may be referred to as a press shaped product for convenience. The press shaped product of the present invention is preferably obtained by press-molding the press-molding material of the present invention.

Here, the weld line is a portion in which a linear pattern is confirmed to be generated in a portion where flows of the plurality of resin melted materials are joined in the metal mold during molding in a shaped product obtained by a molding method in which a resin-based material is melted and made to flow, which may also be referred to as a weld or a weld portion. The weld line is so called due to the linear weld marks made when metal materials are welded together. The presence of the weld line not only deteriorates the surface design of the shaped product, but also leads to a lack of strength.

Furthermore, the shaped product of the present invention preferably has a plurality of standing planes and a portion where the composite material forms a self-laminated structure (may be simply referred to as a laminated portion) in at least one location in the boundary regions between the standing planes, preferably two or more locations, more preferably four or more locations, particularly preferably in all the boundary regions between the standing planes.

The shaped product of the present invention may have a portion where a certain standing plane forms a self-laminated structure. Examples of such a shaped product include a shaped product in which two adjacent standing planes in the press-molding material have self-laminatable regions which form one standing plane by press-molding to obtain the shaped product.

The thickness of the shaped product of the present invention is not particularly limited, but the thickness is usually preferably in the range of 0.01 mm to 100 mm, more preferably in the range of 0.01 mm to 50 mm, even more preferably in the range of 0.01 mm to 5 mm, still more preferably in the range of 0.1 mm to 5 mm, and particularly preferably in the range of 1 to 3 mm. In a case of a shaped product having different thickness depending on the site, the average thickness is preferably in the above range, and both the minimum value and the maximum value are more preferably in the above ranges. The size of the shaped product of the present invention is not particularly limited, and is appropriately set according to the application.

As a method for producing the shaped product of the present invention, it is possible to use a known method as a press-molding method of a thermoplastic resin. A manufacturing method is preferable in which, using a metal mold having an upper mold and a lower mold in which a molding cavity is formed by clamping the upper mold and the lower mold, a press-molding material, which includes discontinuous reinforcing fibers having an average fiber length of 3 mm to 100 mm and a thermoplastic resin as a matrix, which has a certain reference plane, at least one standable plane, and at least one self-laminatable region, and in which at least one standable plane is included in the self-laminatable region, is arranged in the metal mold and press molded. Preferable aspects of the press-molding material are as described above.

In the press-molding described above, a cold press-molding method is preferable, that is, a method in which the press-molding material described above is heated to a temperature equal to or higher than the softening point of the thermoplastic resin as the matrix to enter a plastic state and arranged and clamped in a metal mold at a temperature lower than the softening temperature such that the standable plane is made to stand with respect to the reference plane of the press-molding material and the self-laminatable region is self-laminated, so as to carry out press-molding. More specifically, after heating the press-molding material of the present invention to a plastic state, the press-molding material is arranged so as to form a self-laminated structure in at least one location in the boundary regions between the reference plane 3 or the standable plane 2 of the press-molding material. Specifically, it is possible to obtain a shaped product having a self-laminated structure by arranging the reference plane 3 and the standable plane 2, or the standable planes 2, so as to overlap each other and performing press-molding. The overlapping length (overlap amount) is preferably 1 mm or more from the end of the molding material, more preferably 5 mm or more, even more preferably 10 mm or more, and 20 mm or more is preferable. In the method for manufacturing a shaped product of the present invention, it is preferable to arrange the press-molding materials in a metal mold using a mechanical mechanism such as a robot arm.

In the method for manufacturing a shaped product of the present invention, it is possible to obtain a shaped product having a specific self-laminated structure from a press-molding material by a single press-molding and to produce a shaped product of a fiber-reinforced composite material having a three-dimensional shape with extremely efficient productivity.

The metal mold used for press-molding is preferably a metal mold for press-molding formed of an upper mold and a lower mold and, in a case of using a metal mold for press-molding, the metal mold in which the press-molding material is arranged is generally the lower mold. As for the metal mold, furthermore, the metal molds are roughly classified into two kinds: sealed metal molds used for casting, injection molding, flow press (stamping) molding, and the like, and open metal molds used for folding molding, deep drawing, forging, and the like. The sealed metal mold is suitable mainly for a method of molding by pouring a material into the inside thereof, and the open metal mold is suitable for a method of molding by deforming the material mainly without allowing the material to flow. Since the press-molding material of the present invention is particularly a suitable material for a method in which a material is allowed to flow and fill a cavity, it is preferable to use the former sealed metal mold as the molding mold. In the sealed metal mold, a shear edge for blocking the outflow of the material is generally provided.

The temperature in the metal mold during press-molding depends on the type of thermoplastic resin as the matrix of the press-molding material, but the thermoplastic resin in the melted plastic state may be cooled and solidified to form a shaped product, and it is preferable that the temperature is 20° C. or less from the softening temperature of the thermoplastic resin. In the case of typical nylons such as nylon 6 (polyamide 6), the temperature is usually 120° C. to 180° C., preferably 125° C. to 170° C., and even more preferably 130° C. to 160° C.

The discontinuous reinforcing fibers and the thermoplastic resin as a matrix in the composite material included in the material forming the shaped product of the present invention, the composition and form of the constituent components thereof, and the like are almost the same as for the press-molding material, as described below.

As the manufacturing method of the shaped product, in addition to the above conditions, in the case where a projected area of the press-molding material in the clamping direction is defined as a blank area when arranging the press-molding material in the molding cavity of the metal mold, it is preferable to include an operation of arranging at least one sheet of the press-molding material so as to have the blank area with a ratio of 90% to 110% with respect to the product part area defined as a projected area of the molding cavity in the mold clamping direction of the metal mold. After the press-molding material is arranged in the molding cavity of the metal mold, the mold clamping is naturally performed, and it is possible to obtain a shaped product having a desired shape. When the ratio of the blank area to the product part area is 90% or more, filling defects during molding do not easily occur, which is preferable, and when 110% or less, it is difficult for the blank to bite the metal mold during molding, which is preferable. The ratio of the blank area to the product part area is more preferably 95% or more and 105% or less.

As a method of manufacturing a shaped product, when an operation is included in which the press-molding material is arranged in the molding cavity of a metal mold in a state where the self-laminatable region of the press-molding material is self-laminated such that the self laminated region has a site where the width (may be referred to as the self-lamination width) is 20 mm or more, the strength of the site formed by self-laminating the press-molding material during the press-molding is excellent, which is preferable. Furthermore, as a method of manufacturing a shaped product, a manufacturing method including an operation in which a press-molding material having two adjacent self-laminatable regions is arranged in a metal mold cavity in a state where one self-laminatable region and the other self-laminatable region are self-laminated with a width of 20 mm or more, is more preferable. There is no particular upper limit for the self-lamination width, but the self-lamination width is preferably 50 mm or less such that molding defects caused by a pressure is applied in a concentrated manner to the site where the press-molding material is self-laminated at the time of press-molding do not easily occur. The self-lamination width is more preferably 40 mm or less, and even more preferably 30 mm or less.

[Discontinuous Reinforcing Fibers]

(Types of Discontinuous Reinforcing Fiber)

It is possible to appropriately select the type of the discontinuous reinforcing fibers included in the press-molding material of the present invention or the composite material which is the material of the shaped product depending on the type of the thermoplastic resin, the use of the composite material, or the like, without being particularly limited. Therefore, it is possible to suitably use either inorganic fibers or organic fibers as the discontinuous reinforcing fibers used in the present invention.

Examples of inorganic fibers include carbon fibers, activated carbon fibers, graphite fibers, glass fibers, tungsten carbide fibers, silicon carbide fibers (carborundum fibers), ceramic fibers, alumina fibers, natural mineral fibers (basalt fibers, and the like), boron fibers, boron nitride fibers, boron carbide fibers, metal fibers, and the like.

Examples of the metal fibers include aluminum fibers, copper fibers, brass fibers, stainless steel fibers, and steel fibers.

Examples of the glass fibers include fibers formed of E glass, C glass, S glass, D glass, T glass, quartz glass fibers, borosilicate glass fibers, and the like.

Examples of the organic fibers include fibers formed of aramid, polyparaphenylene benzoxazole (PBO), polyphenylene sulfide, polyester, acrylic, polyamide, polyolefin, polyvinyl alcohol, polyarylate, or the like.

In the present invention, two or more kinds of reinforcing fibers may be used in combination. In such a case, a plurality of kinds of inorganic fibers may be used in combination, a plurality of kinds of organic fibers may be used in combination, and inorganic fibers and organic fibers may be used in combination. Examples of aspects in which a plurality of kinds of inorganic fibers are used in combination include an aspect in which carbon fibers and metal fibers are used in combination, an aspect in which carbon fibers and glass fibers are used in combination, and the like. On the other hand, examples of aspects in which a plurality of kinds of organic fibers are used in combination include an aspect in which aramid fibers and fibers formed of other organic materials are used in combination, and the like. Furthermore, examples of aspects in which inorganic fibers and organic fibers are used in combination include an aspect in which carbon fibers and aramid fibers are used in combination. In addition to the discontinuous reinforcing fibers, the press-molding material of the present invention and the composite material which is the material of the shaped product may include continuous fibers of the above fibers as long as there is no obstacle to the effect of solving the problem of the present invention.

(Carbon Fibers)

In the present invention, the discontinuous reinforcing fibers described above are preferably carbon fibers. This is because the carbon fibers enable to obtain a composite material that is lightweight but excellent in strength.

As the carbon fibers described above, polyacrylonitrile (PAN)-based carbon fibers, petroleum pitch-based carbon fibers, coal pitch-based carbon fibers, rayon-based carbon fibers, cellulose-based carbon fibers, lignin-based carbon fibers, phenol-based carbon fibers, vapor deposited carbon fibers, and the like are generally known, and it is possible to suitably use any of these carbon fibers in the present invention.

Among these, in the present invention, it is preferable to use polyacrylonitrile (PAN)-based carbon fibers in terms of excellent tensile strength. In a case where PAN-based carbon fibers are used as the reinforcing fibers, the tensile modulus of elasticity thereof is preferably in the range of 100 to 600 GPa, more preferably in the range of 200 to 500 GPa, and even more preferably in the range of 230 to 450 GPa. The tensile strength of the PAN-based carbon fibers is preferably in the range of 2,000 to 10,000 MPa, and more preferably in the range of 3,000 to 8,000 MPa.

(Fiber Length of Discontinuous Reinforcing Fibers)

It is essential that the discontinuous reinforcing fibers included in the press-molding material of the present invention and the composite material which is the material of the shaped product have an average fiber length of 3 to 100 mm. This average fiber length may be a number average fiber length or a weight average fiber length, but a weight average fiber length is more preferable.

The discontinuous reinforcing fibers more preferably have a weight average fiber length of 3 to 80 mm, and even more preferably 5 to 60 mm. When the weight average fiber length of the reinforcing fibers is 100 mm or less, the flowability of the molding material including the reinforcing fibers is good, and a desired shaped product shape is easily obtained by press-molding or the like. On the other hand, when the weight average fiber length is 3 mm or more, the molding material including reinforcing fibers often has good mechanical strength. The lower limit of the weight average fiber length range of each of the discontinuous reinforcing fibers is more preferably more than 10 mm. The reinforcing fibers which satisfy the ranges of the respective weight average fiber lengths are even more preferably carbon fibers.

As the discontinuous reinforcing fibers related to the present invention, one or more reinforcing fibers selected from the group consisting of carbon fibers, glass fibers, aramid fiber, boron fibers, and basalt fibers, which are in the weight average fiber length range, are even more preferable.

As the discontinuous reinforcing fibers included in the press-molding material of the present invention and the composite material which is the material of the shaped product, discontinuous reinforcing fibers having different weight average fiber lengths may be used in combination. In other words, the discontinuous reinforcing fibers according to the present invention may have a single peak in weight average fiber length or may have a plurality of peaks.

It is possible to determine the average fiber length of the discontinuous reinforcing fibers, for example, based on the following expression (f) by measuring the fiber length of 100 fibers randomly extracted from the molding material up to a unit of 1 mm using a caliper or the like. Measurement of the average fiber length is carried out using the weight average fiber length (Lw). When the fiber length of each discontinuous reinforcing fiber is Li and the number of measurements is j, the number average fiber length (Ln) and the weight average fiber length (Lw) are obtained by the following expressions (m) and (f).

$$Ln = \Sigma Li/j \quad (m)$$

$$Lw = (\Sigma Li^2)/(\Sigma Li) \quad (f)$$

In a case where the fiber length of the discontinuous reinforcing fibers is constant, the number average fiber length and the weight average fiber length become the same value. It is possible to carry out the extraction of the reinforcing fibers from the shaped product or the molding material, for example, by subjecting the shaped product (molding material) to a heat treatment at 500° C. for approximately 1 hour and removing the resin in a furnace.

(Single Fiber Diameter of Discontinuous Reinforcing Fibers)

The single fiber diameter of the discontinuous reinforcing fibers used in the present invention may be appropriately determined according to the type of the discontinuous reinforcing fibers, and is not particularly limited. For example, in a case where carbon fibers are used as the discontinuous reinforcing fibers, usually, the average diameter of single fibers is preferably in the range of 3 μm to 50 μm, more preferably in the range of 4 μm to 12 μm, and even more preferably in the range of 5 μm to 8 μm.

On the other hand, in a case where glass fibers are used as the discontinuous reinforcing fibers, usually, the average diameter of single fibers is preferably in the range of 3 μm to 30 μm. Here, the average diameter of single fibers described above refers to the diameter of the single fibers forming the reinforcing fibers.

It is possible to measure the average diameter of single fibers in the discontinuous reinforcing fiber by, for example, the method described in JIS R 7607 (2000).

(Form of Reinforcing Fibers)

Regardless of the type, the discontinuous reinforcing fibers used in the present invention may be a type of single fiber formed of one single fiber or a type of a bundle of single fibers, the bundle being formed of a plurality of single fibers. The reinforcing fibers included in the molding material or the like of the present invention may be only a type of a single fiber, only a type of a bundle of single fibers, or a mixture of both types. The bundle of single fibers shown here indicates that two or more single fibers are in proximity due to a sizing agent, electrostatic force, or the like. In a case of using single fibers, the number of single fibers forming each bundle of single fibers may be substantially uniform or different in each bundle of single fibers.

With respect to the present invention, reinforcing fibers in the form of bundle of single fibers may be referred to as reinforcing fiber bundles for convenience. One reinforcing fiber bundle functions as one filler in a fiber-reinforced resin shaped product or a molding material thereof. When fibers which are individual reinforcing fibers randomly collected with tweezers or the like from a reinforced fiber sample in which a thermoplastic resin as the matrix is removed from a fiber-reinforced resin shaped product or a molding material are a bundle of a plurality of single fibers, it is possible to regard these fibers as a reinforcing fiber bundle.

As a representative reinforcing fiber bundle, a plurality of single fibers are oriented roughly in the same direction and the longitudinal sides thereof are in contact with each other to form a bundle, but the reinforcing fiber bundle is not limited to this form. For example, a plurality of single fibers may be in a bundle oriented in various directions, and a plurality of single fibers may be close to each other on a portion of the longitudinal side surface, but the single fibers may be separated in another portion to form a bundle.

Many of the reinforcing fibers which are commercially produced and sold have a structure in which single fibers are bundled and the number of single fibers therein varies but is often in the range of 1,000 to 100,000. For example, carbon fibers are generally in a bundle in which several thousand to several tens of thousands of carbon single fibers are gathered.

In a case where reinforcing fibers are used in the manufacturing of composite materials, if the reinforcing fibers are used without being widened or opened, the entangled portions of the reinforcing fibers become locally thick, which may make it difficult to obtain a thin-walled composite material. For this reason, the reinforcing fibers are preferably used as a composite material after being widened or opened and then appropriately cut.

In a case where the reinforcing fibers are used after being opened, although the degree of opening is not particularly limited, it is preferable to control the degree of opening of the reinforcing fibers and to include reinforcing fibers formed of a certain number or more of single reinforcing fibers, and reinforcing fibers formed of less than a specific number of single reinforcing fibers or single fibers, that is, free single reinforcing fibers.

Specifically, the form of the discontinuous reinforcing fibers is preferably the form of reinforcing fibers in the base material or the like described in Pamphlet of International Publication No. 2012/105080, Pamphlet of International Publication No. 2013/031860, or the like, for example, a mixture of reinforcing fibers (A) which are a bundle of single fibers formed of single reinforcing fibers of a number which is the critical single fiber number defined by the following expression (1) or more and other reinforcing fibers (B) is preferable. These reinforcing fibers (B) are reinforcing fibers formed of single reinforcing fibers of a number less than the critical single fiber number, but free single reinforcing fibers are also included therein. To differentiate the reinforcing fibers (A) and the reinforcing fibers (B), these may be referred to as reinforcing fibers behaving as a bundle of single fibers and reinforcing fibers behaving as free single fibers, respectively. This is based on the finding that, even with reinforcing fibers of a bundle of single fibers, a bundle where the number of constituent single fibers is less than a specific numerical value (critical number of single fibers)

corresponding to the diameter of the single fiber exhibits the same behaviour as free single reinforcing fibers in the composite material.

$$\text{Critical Number of single fibers} = 600/D \quad (1)$$

(here, D is the average diameter of single fibers (μm) of the reinforcing fibers)

Specifically, in a case where the average diameter of single fibers in the reinforcing fibers forming the shaped product is in the range of 5 μm to 7 μm, the critical number of single fibers defined by the expression (1) is 86 to 120.

Furthermore, the ratio of the amount of the reinforcing fibers (A) to the total amount of the discontinuous reinforcing fibers included in the press-molding material of the present invention and the composite material which is the material of the shaped product is preferably more than 0 vol % and less than 99 vol %, more preferably 20 vol % or more and less than 99 vol %, even more preferably 30 vol % or more and less than 95 vol %, and most preferably 50 vol % or more and less than 90 vol %. This is because making the discontinuous reinforcing fibers formed of single reinforcing fibers having a specific number or more be present with other discontinuous reinforcing fibers at a specific ratio makes it possible to increase the amount of reinforcing fibers in the composite material, that is, the volume fraction of reinforcing fibers (Vf).

In the present invention, it is possible to appropriately determine the average number of single fibers (N) in the reinforcing fibers (A) as long as the object of the present invention is not impaired, without being particularly limited. In the case of general-purpose reinforcing fibers, N usually has a value in the range of 1<N<12,000, and more preferably satisfies the following expression (2).

$$0.6 \times 10^4/D^2 < N < 1.0 \times 10^5/D^2 \quad (2)$$

(here D is the average diameter of single fibers (μm) in the reinforcing fibers)

Then, in a case where the reinforcing fibers are carbon fibers having an average diameter of single fibers of 5 μm, the average number of single fibers in the reinforcing fibers (A) is in the range of 240 to less than 4000, and preferably 300 to 2,500. 400 to 1,600 fibers is more preferable. In a case where the reinforcing fibers are carbon fibers having an average diameter of single fibers of 7 μm, the average number of single fibers in the reinforcing fibers (A) is in the range of 122 to 2040, preferably 150 to 1500, and more preferably 200 to 800.

(Orientation State of Discontinuous Reinforcing Fiber)

The orientation state of the discontinuous reinforcing fibers included in the press-molding material of the present invention and the composite material which is the material of the shaped product may vary depending on the purpose. So-called two-dimensional random orientation, in which discontinuous reinforcing fibers are not oriented in a specific direction in the in-plane direction of a press-molding material or the like, but an extremely small number are oriented in the thickness direction, is preferable. In particular, the state of the carbon fibers in the random mat and the like described in Pamphlet of International Publication No. 2012/105080 and Pamphlet of International Publication No. 2013/031860 is preferable.

Particularly in a case of numerically defining the two-dimensionally oriented reinforcing fibers included in the press-molding material and the shaped product, in the reinforcing fibers, a state in which a surface orientation degree σ is 90% or more may be set to a preferable two-dimensional random orientation, the surface orientation degree σ being defined by: surface orientation degree σ=100×(1−(number of reinforcing fibers having a plane orientation angle γ of 10° or more)/(total number of reinforcing fibers)), as disclosed in Japanese Patent Application Laid-Open No. 2012-246428.

Furthermore, with respect to an arbitrary rectangular region in a cross-section obtained by cutting a sample such as a press-molding material in the thickness direction, the thickness direction of the shaped product or a direction different from the thickness direction of the shaped product is defined as the Z direction, and observation, measurement, and calculation of the surface orientation degree σ may be performed for the reinforcing fibers in accordance with the above publication. In that case, regarding the angle formed by the major axis of the reinforcing fiber cross-section and the surface of the mold plate, which is necessary for calculating the plane orientation angle γ, the angle formed by the upper side or the lower side of the rectangular region to be observed may also be used with the major axis of the reinforcing fiber cross-section, instead of the surface of the mold plate.

(Volume Fraction (Vf) of Reinforcing Fibers)

There is no particular limitation on the volume fraction of reinforcing fibers (may simply be referred to below as "Vf") in the press-molding material of the present invention or the composite material which is the material of the shaped product. However, in all cases, the volume fraction of reinforcing fibers (Vf) with respect to the contained discontinuous reinforcing fibers and the thermoplastic resin as the matrix is preferably 5% to 80% as defined by Expression (u) below, and Vf is more preferably 20% to 60%.

$$Vf=100\times(\text{Volume of discontinuous reinforcing fibers})/((\text{Volume of discontinuous reinforcing fibers})+(\text{Volume of thermoplastic resin})) \quad (u)$$

When Vf of the shaped product is higher than 5%, the reinforcing effect is sufficiently exhibited and when Vf is 80% or less, voids are less likely to be generated in the obtained shaped product, and there is less concern that the physical properties of the shaped product will be deteriorated, which is preferable.

(Areal Weight and Thickness of Discontinuous Reinforcing Fiber)

The areal weight of the discontinuous reinforcing fiber included in the press-molding material of the present invention and the composite material which is the material of the shaped product is not particularly limited, but is usually set to 25 g/m$^2$ to 10000 g/m$^2$.

[Thermoplastic Resin]

The thermoplastic resin as a matrix of the press-molding material of the present invention and the composite material which is the material of the shaped product is not particularly limited as long as it is possible to obtain a shaped product having a desired strength and may be appropriately selected.

Examples of thermoplastic resins include polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyether ketone resins, thermoplastic urethane resins, fluorine-based resins, thermoplastic polybenzimidazole resin, vinyl-based resins, and the like.

Examples of polyolefin resins include polyethylene resins, polypropylene resins, polybutadiene resins, polymethylpentene resins, and the like.

Examples of vinyl resins include vinyl chloride resins, vinylidene chloride resins, vinyl acetate resins, polyvinyl alcohol resins, and the like.

Examples of polystyrene resins include atactic polystyrene resins, isotactic polystyrene resins, syndiotactic polystyrene resins, acrylonitrile-styrene resins (AS resins), acrylonitrile-butadiene-styrene resins (ABS resins), and the like.

Examples of polyamide resins include polyamide 6 resin (nylon 6), polyamide 11 resin (nylon 11), polyamide 12 resin (nylon 12), polyamide 46 resin (nylon 46), polyamide 66 resin (nylon 66), polyamide 610 resin (nylon 610), and the like.

Examples of polyester resins include polyethylene terephthalate resin, polyethylene naphthalate resin, polybutylene terephthalate resin, polytrimethylene terephthalate resin, liquid crystal polyester, and the like.

Examples of (meth) acrylic resins include polymethyl methacrylate. Examples of the modified polyphenylene ether resin include modified polyphenylene ether and the like.

Examples of thermoplastic polyimide resins include thermoplastic polyimide, polyamideimide resin, polyetherimide resin, and the like.

Examples of polysulfone resins include a modified polysulfone resin, a polyether sulfone resin, and the like.

Examples of polyether ketone resins include a polyether ketone resin, a polyether ether ketone resin, and a polyether ketone ketone resin.

Examples of fluorine-based resins include polytetrafluoroethylene and the like.

The thermoplastic resin used in the present invention may be a copolymer or a modified product, and may be a single kind or two or more kinds. Examples of an aspect in which two or more kinds of thermoplastic resins are used in combination include an aspect in which thermoplastic resins having mutually different softening points or melting points are used in combination, an aspect in which thermoplastic resins mutually having different average molecular weights are used in combination, or the like without being limited thereto.

(Other Agents)

The press-molding material of the present invention and the composite material which is the material of the shaped product may include additives such as non-fibrous fillers, flame retardants, anti-UV agents, stabilizers, release agents, pigments, softeners, plasticizers, and surfactants in a range in which the object of the present invention is not impaired.

EXAMPLES

Examples will be shown below, but the present invention is not limited thereto.

Manufacturing of Base Material

Manufacturing Example 1

Using PAN-based carbon fibers "Tenax" (registered trademark) (average diameter of single fibers is 7 µm, number of single fibers is 24,000, tensile modulus of elasticity is 240 GPa.) manufactured by Toho Tenax and processed with a nylon-based sizing agent as reinforcing fibers and using a nylon 6 resin A1030 (melting point 225° C.) manufactured by Unitika Ltd., as a thermoplastic resin, a random mat having a two-dimensional random orientation was prepared based on the method described in Pamphlet of International Publication No. 2012/105080 and Pamphlet of International Publication No. 2013/031860. The random mat was heated and pressed such that the nylon 6 resin was impregnated into a mat-like material of carbon fibers to obtain a flat base material having a thickness of 2.5 mm With respect to the reinforcing fibers (carbon fibers) in the base material, the volume fraction of reinforcing fibers Vf was 35%, the areal weight of the reinforcing fibers was 1660 g/cm$^2$, the length of the reinforcing fiber was 20 mm as the weight average fiber length, the ratio of the reinforcing fibers (A) formed of single fibers in a number equal to or greater than the critical single fiber number, more specifically, the carbon fibers (A), was 85 Vol % with reference to the total amount of the reinforcing fibers, and the average number of single fibers (N) of the reinforcing fibers (A) was 900. In the reinforcing fibers in the base material, 15 vol % was reinforcing fibers (B) formed of single fibers of less than the critical single fiber number. Both the reinforcing fibers (B) and the reinforcing fiber (A) were a mixture of bundle of single fibers having different numbers of single fibers. As the reinforcing fibers (B), a small amount of completely opened free carbon single fibers was also included in the base material.

The tensile elongation at break εv of the obtained base material was in the range of 105% to 400%.

[Manufacturing of Shaped Product]

In the Examples and Comparative Examples described below, unless otherwise specified, the base material obtained in the above Manufacturing Example 1 was cut out into the respective blank shapes described in each Example and the like to obtain a press-molding material, which was subjected to cold press-molding to obtain a shaped product.

In each of Examples and Comparative Examples, a metal mold corresponding to the shape of a desired shaped product was used. Unless otherwise specified, the temperature when the press-molding material is heated to a temperature equal to or higher than the softening temperature of the thermoplastic resin as the matrix is 280° C., and the temperature of the metal mold at a temperature lower than the softening temperature is 150° C., and the pressure at the time of press-molding is 20 MPa.

[Strength Test Method]

Figure 5A:
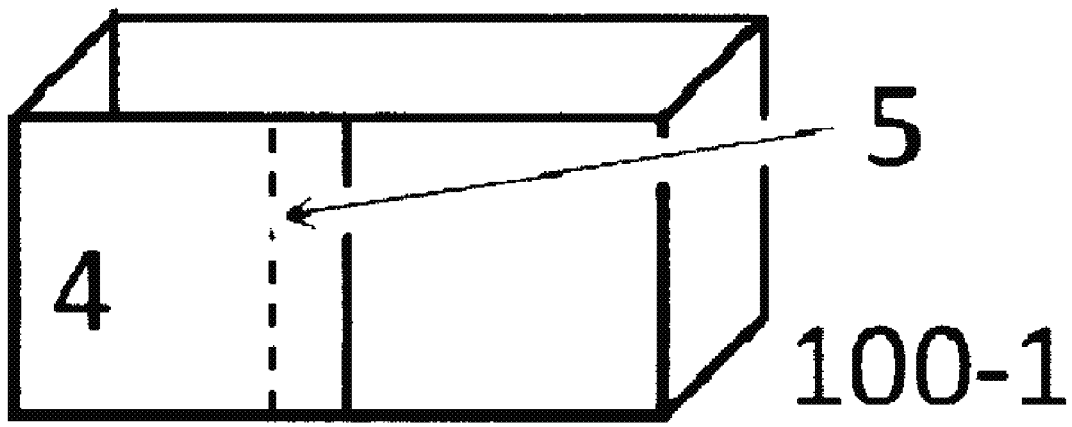
FIG. 5A to FIG. 5C are schematic views showing shapes of shaped products according to Examples.
Figure 5B:
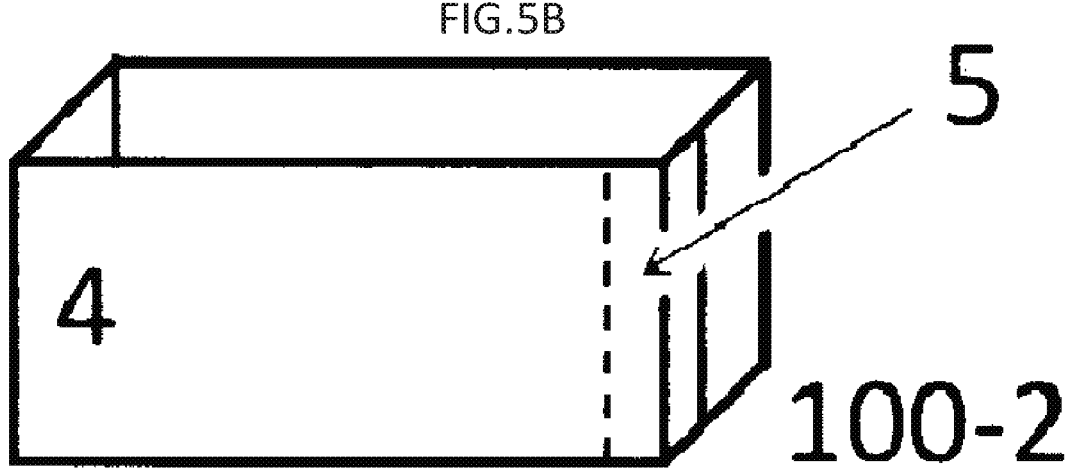
Figure 5C:
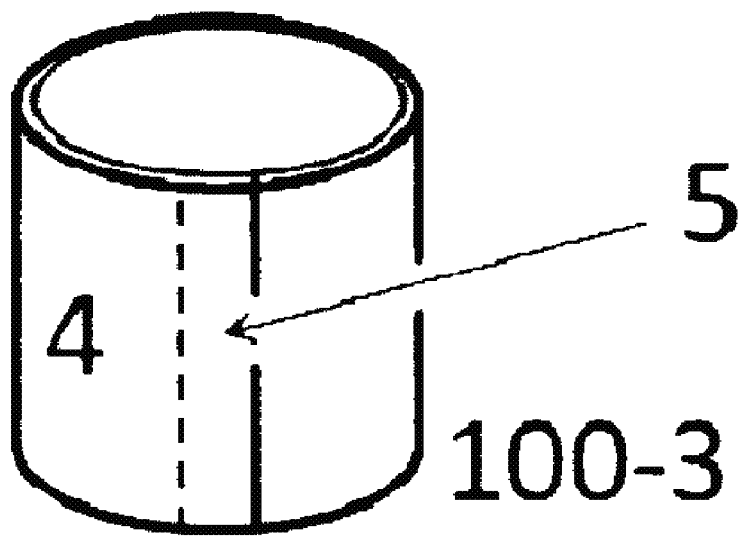

From the press shaped products having a thickness of 2.5 mm shown in FIG. 5A to FIG. 5C, a test piece with a width of 15 mm and a length of 100 mm was cut out such that the self-laminated structure portion was the center in the longitudinal direction, and dried at 110° C. for 12 hours or more. The test piece was set in a circular jig and compressed at a test speed of 5 mm/min using a test machine Instron 5982 model to determine the maximum stress. Furthermore, the strength parameter was calculated from Expression (s).

Strength parameter=(maximum stress)×100/(maximum stress at weld portion of control sample with same shape)    (s)

Figure 6A:
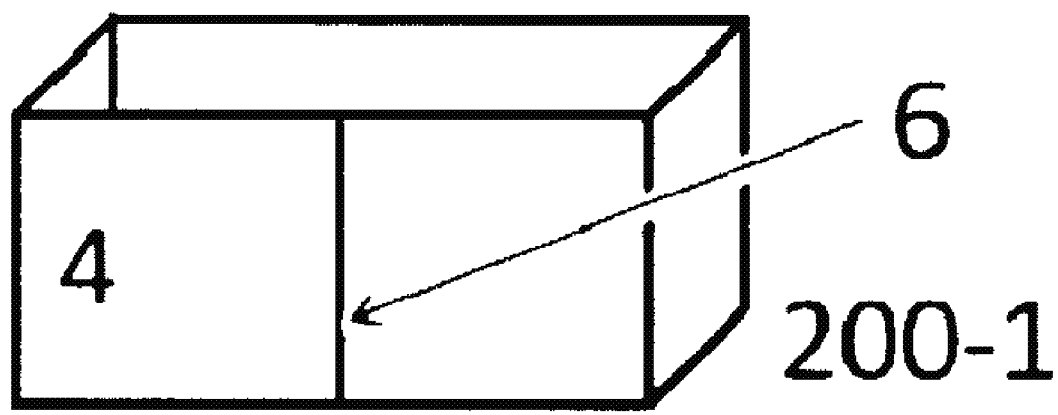
FIG. 6A to FIG. 6C are schematic views showing shapes of shaped products according to Comparative Examples.
Figure 6B:
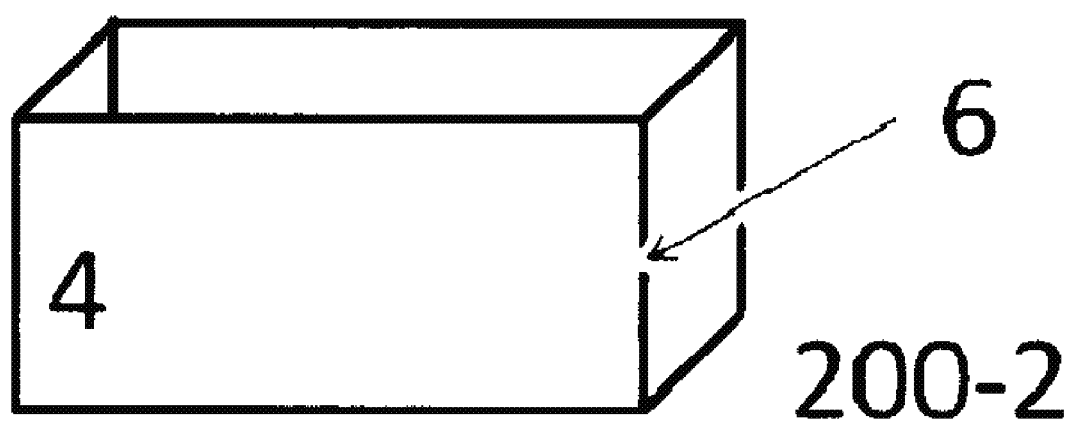
Figure 6C:
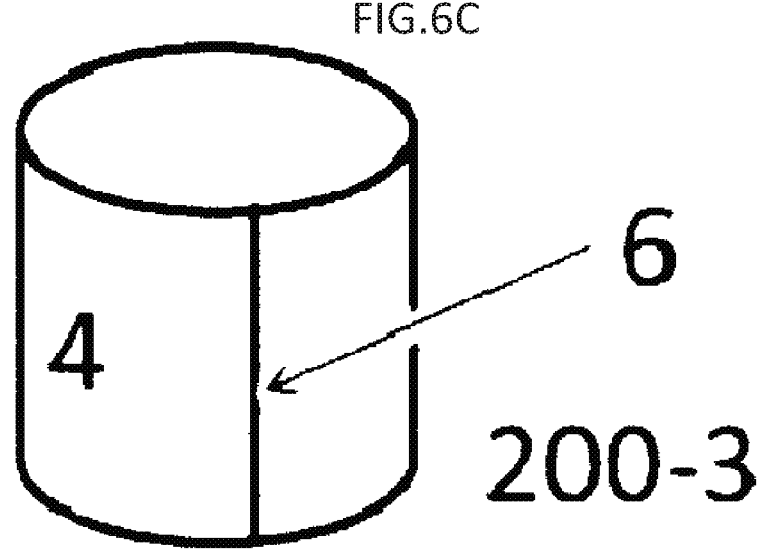
Figure 7:
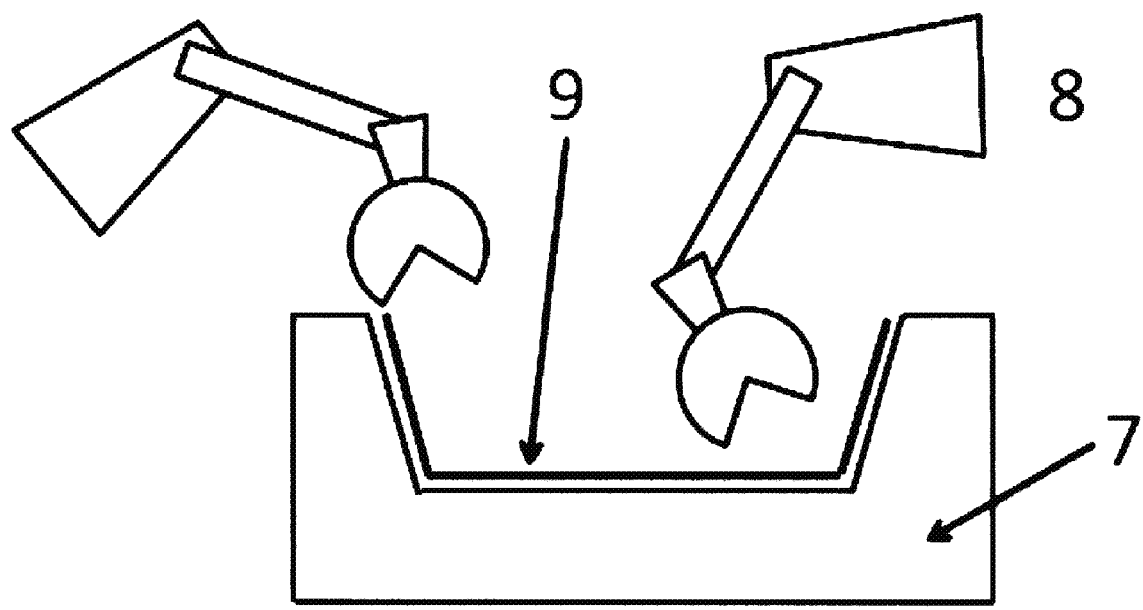
FIG. 7 is a schematic view showing a press-molding material being arranged by a mechanical mechanism.

Here, the maximum stress at the weld portion of the control sample having the same shape means the maximum stress obtained with regard to the shaped products obtained by press-molding (respectively, FIG. 6A to FIG. 6C) using a metal mold with the same shape as that used for the press-molding of the shaped products shown in FIG. 5A to FIG. 5C, the overlap amount of the ends of the press-molding material being 0 mm, that is, without self-lamination, by cutting out a test piece (control test piece) with the same shape as described above such that the weld portion is the center in the longitudinal direction, and subjecting the control test piece to a compression test in the same manner as described above. In the following Examples and Comparative Examples, portions where the ends of the press-molding material are arranged to be adjacent to each other to be weld lines after press-molding may be collectively referred to as welds.

Example 1

The three-dimensional shape of the shaped product having the shape in FIG. 5A was subjected to inverse analysis of molding process and developed by a computer after at least one of the elements of the three-dimensional shape was removed from the three-dimensional shape. The base material obtained in Manufacturing Example 1 was cut out into a blank shape developed from the three-dimensional shape, and a press-molding material was obtained which had a reference plane, at least one standable plane and at least one self-laminatable region, in which a portion of the standable plane was included in the self-laminatable region.

The press-molding material was heated to a temperature equal to or higher than the softening temperature of the thermoplastic resin as a matrix. The press-molding material was arranged in a metal mold at the temperature lower than the softening temperature such that a standable plane was made to stand with respect to a reference plane of the press-molding material and portions of self-laminatable regions within 15 mm from the end of the molding material were arranged so as to be self-laminated on the metal mold surface corresponding to a flat surface portion of the shaped product. Then press-molding was performed to obtain a shaped product 100-1 having a laminated portion 5. The strength parameter of the laminated portion of this shaped product was 250. Table 1 shows the molding conditions and results. At the time of press-molding, the length (15 mm in the present embodiment) of the self-lamination of the ends of the molding material may be referred to below as the overlap amount.

Example 2

A press-molding material obtained in the same manner as in Example 1 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material and portions of self-laminatable regions within 30 mm from the end of the molding material were arranged so as to be self-laminated on the metal mold surface corresponding to the flat surface portion of the shaped product. Then press-molding was performed to obtain the shaped product 100-1 having the laminated portion 5. The strength parameter of the laminated portion of this shaped product was 300. Table 1 shows the molding conditions and results.

Example 3

A press-molding material obtained in the same manner as in Example 1 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material and portions of self-laminatable regions within 45 mm from the end of the molding material were arranged so as to be self-laminated on the metal mold surface corresponding to the flat surface portion of the shaped product. Then press-molding was performed to obtain the shaped product 100-1 having the laminated portion 5. The strength parameter of the laminated portion of this shaped product was 400. Table 1 shows the shaped product conditions and results.

Example 4

The three-dimensional shape of the shaped product having the shape in FIG. 5B was subjected to inverse analysis of molding process and developed by a computer after at least one of the elements of the three-dimensional shape was removed from the three-dimensional shape. The base material obtained in Manufacturing Example 1 was cut out into a blank shape developed from the three-dimensional shape, and a press-molding material was obtained which had a reference plane, at least one standable plane and at least one self-laminatable region, in which a portion of the standable plane was included in the self-laminatable region.

The press-molding material was heated to a temperature equal to or higher than the softening temperature of a thermoplastic resin as a matrix. The press-molding material was arranged in a metal mold at the temperature lower than the softening temperature such that a standable plane was made to stand with respect to the reference plane of the press-molding material and portions of self-laminatable regions within 15 mm from the end of the molding material were arranged so as to be self-laminated on the metal mold surface corresponding to the corner of the shaped product. Then press-molding was performed to obtain a shaped product 100-2 having the laminated portion 5. The strength parameter of the laminated portion of this shaped product was 200. Table 2 shows the molding conditions and results.

Example 5

A press-molding material obtained in the same manner as in Example 4 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material and portions of self-laminatable regions within 30 mm from the end of the molding material were arranged so as to be self-laminated on the metal mold surface corresponding to the corner of the shaped product. Then press-molding was performed to obtain the shaped product 100-2 having the laminated portion 5. The strength parameter of the laminated portion of this shaped product was 200. Table 2 shows the molding conditions and results.

Example 6

The three-dimensional shape of the shaped product having the shape in FIG. 5C was subjected to inverse analysis of molding process and developed by a computer after at least one of the elements of the three-dimensional shape was removed from the three-dimensional shape. The base material obtained in Manufacturing Example 1 cut out into a blank shape developed from the three-dimensional shape, and a press-molding material was obtained which has a reference plane, at least one standable plane and at least one self-laminatable region, in which a portion of the standable plane is included in the self-laminatable region.

The press-molding material was heated to a temperature equal to or higher than the softening temperature of a thermoplastic resin as a matrix. The press-molding material was arranged in a metal mold at the temperature lower than the softening temperature such that a standable plane was made to stand with respect to the reference plane of the press-molding material and portions of self-laminatable regions within 15 mm from the end of the molding material were arranged so as to be self-laminated in the self-laminatable region on the metal mold surface corresponding to the curved surface portion of the shaped product. Then press-molding was performed to obtain a shaped product 100-3 having the laminated portion 5. The strength parameter of the laminated portion of this shaped product was 180. Table 3 shows the molding conditions and results.

Example 7

A press-molding material obtained in the same manner as in Example 6 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material and portions of self-laminatable regions within 30 mm from the end of the molding material were arranged so as to be self-laminated on the metal mold surface corresponding to the curved surface portion of the shaped product. Then press-molding was performed to obtain the shaped product 100-3 having the laminated portion 5. The strength parameter of the laminated portion of this shaped product was 250. Table 3 shows the molding conditions and results.

Comparative Example 1

A press-molding material obtained in the same manner as in Example 1 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material. The molding material was not laminated on the metal mold surface corresponding to the flat surface portion of the shaped product. Then press-molding was performed to obtain a shaped product 200-1, but a weld 6 was generated in the flat surface portion. Table 1 shows the molding conditions and results.

Comparative Example 2

A press-molding material obtained in the same manner as in Example 4 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material. The molding material was arranged so as not to be laminated on the metal mold surface corresponding to the corner of the shaped product. Then press-molding was performed to obtain a shaped product 200-2, but the weld 6 was generated in the corner. Table 2 shows the molding conditions and results.

Comparative Example 3

A press-molding material obtained in the same manner as in Example 6 was heated to a temperature equal to or higher than the softening temperature of a thermoplastic resin as a matrix. The press-molding material was arranged in a metal mold at a temperature lower than the softening temperature such that a standable plane was made to stand with respect to the reference plane of the press-molding material. The molding material was arranged so as not to be laminated on the metal mold surface corresponding to the curved surface portion of the shaped product. Then press-molding was performed to obtain a shaped product 200-3, but the weld 6 was generated in the curved portion. Table 3 shows the molding conditions and results.

Comparative Example 4

The three-dimensional shape of the shaped product having the shape in FIG. 5A was subjected to inverse analysis of molding process and developed by a computer without removing any of the elements of the three-dimensional shape from the three-dimensional shape. The base material obtained in Manufacturing Example 1 was cut out into a blank shape developed from the three-dimensional shape, and a press-molding material was obtained which had a reference plane, at least one standable plane and at least one self-laminatable region, in which a portion of the standable plane was included in the self-laminatable region.

The press-molding material was heated to a temperature equal to or higher than the softening temperature of a thermoplastic resin as a matrix. The press-molding material was arranged in the metal mold at the temperature lower than the softening temperature. Then press-molding was performed. However, the shaped product had wrinkles at the corners, and it was not possible to obtain a shaped product with a good appearance as the shaped product 100-1.

TABLE 1

| | Shape of Joining Portion | Strength Parameter (−) | Overlap Amount (mm) | Shaped product Thickness (mm) |
|---|---|---|---|---|
| Example 1 | Flat | 250 | 15 | 2.5 |
| Example 2 | Flat | 300 | 30 | 2.5 |
| Example 3 | Flat | 400 | 45 | 3.2 |
| Comparative Example 1 | Flat | 100 | 0 | 3.2 |

TABLE 2

| | Shape of Joining Portion | Strength Parameter (−) | Overlap Amount (mm) | Shaped product Thickness (mm) |
|---|---|---|---|---|
| Example 4 | Corner | 200 | 15 | 2.5 |
| Example 5 | Corner | 200 | 30 | 2.5 |
| Comparative Example 2 | Corner | 100 | 0 | 2.5 |

TABLE 3

| | Shape of Joining Portion | Strength Parameter (−) | Overlap Amount (mm) | Shaped product Thickness (mm) |
|---|---|---|---|---|
| Example 6 | Curved surface | 180 | 15 | 2.5 |
| Example 7 | Curved surface | 250 | 30 | 2.5 |

TABLE 3-continued

| | Shape of Joining Portion | Strength Parameter (-) | Overlap Amount (mm) | Shaped product Thickness (mm) |
|---|---|---|---|---|
| Comparative Example 3 | Curved surface | 100 | 0 | 2.5 |

For the following Examples 8 to 23, an object replicating an object obtained by deforming a press-molding material in a heated and plastic state into an appropriate shape according to the shape of a desired shaped product and arranging the material in a metal mold in cold press-molding was prepared. In other words, a metal mold arrangement-simulating object (may simply referred to below as a simulating object) was prepared. The extent of the generation of wrinkles on the surfaces thereof was observed, and it was evaluated whether the press-molding material easily obtained a shaped product with an excellent appearance. Specifically, regarding the evaluation, in a case where no wrinkles are generated in the surface of the obtained metal mold arrangement-simulating object, in particular, in a location corresponding to the periphery of a joining portion (simply referred to below as a joining portion) of two adjacent self-laminatable regions in the press-molding material, the joining portion having a curvature radius R, it was determined that, when the press-molding material is subjected to cold press-molding, it is possible to obtain a shaped product with the same shape as the metal mold arrangement-simulating object and with an extremely good appearance without wrinkles. In a case where a metal mold arrangement-simulating object having wrinkles is obtained, when the press-molding material is cold press molded by a known method without taking special measures and a shaped product having the same shape as the metal mold arrangement-simulating object is obtained, it was determined that there is a concern that the shaped product will have wrinkles on the surface thereof and have problems in terms of appearance.

Example 8

Figure 10:
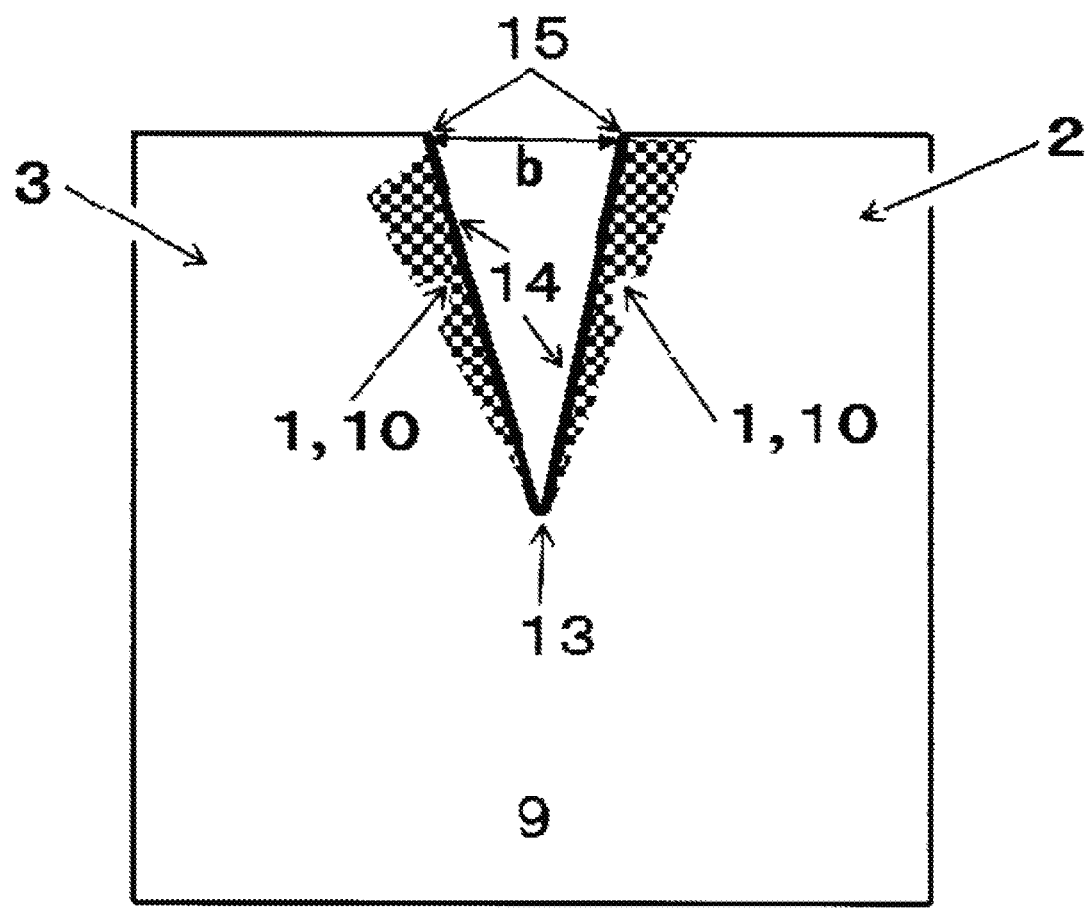
FIG. 10 is a schematic view showing a shape of a press-molding material having two adjacent self-laminatable regions used in Examples 8 to 23 in a thickness direction thereof along with the greatest distance b between self-laminatable regions and the like. The two self-laminatable regions of the press-molding material are equivalent to preliminary laminatable regions.
Figure 11:
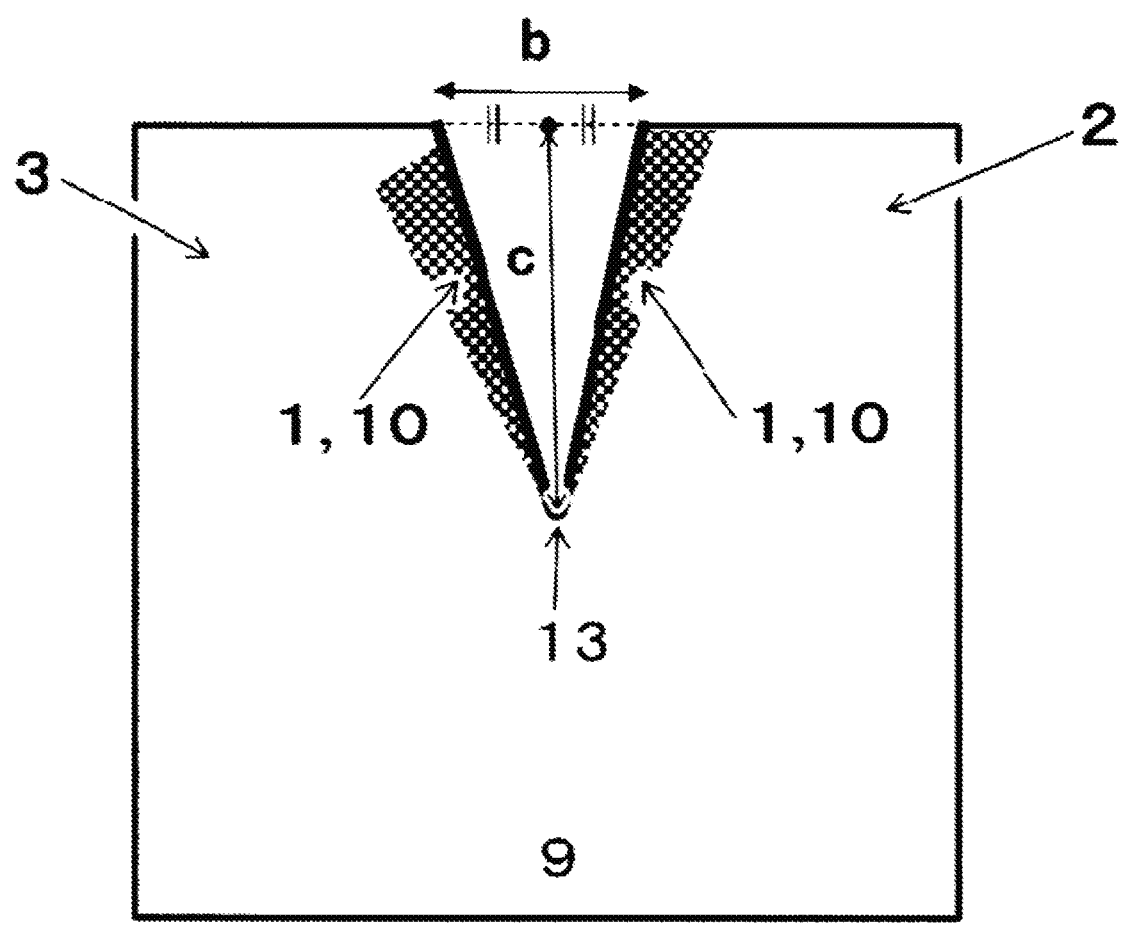
Figure 12A:
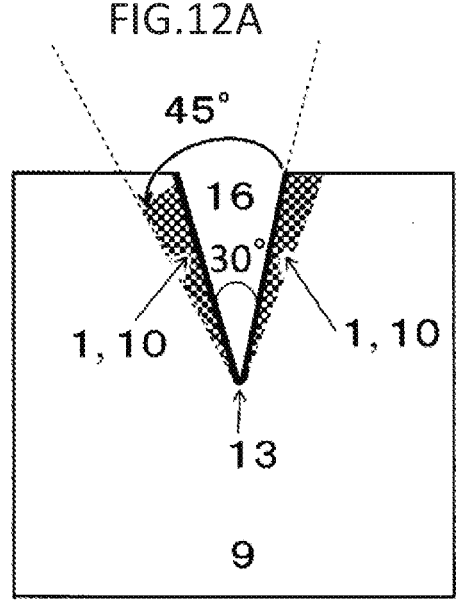
FIG. 12A is a schematic view using a shape of the press-molding material used in Examples 8 to 23 in a thickness direction thereof in the same manner as shown in FIG. 10 and FIG. 11 to show one self-laminatable region of the press-molding material being laminated on another self-laminated region by being pulled at 45° in the counter-clockwise direction seen in the thickness direction of the press-molding material.
Figure 12B:
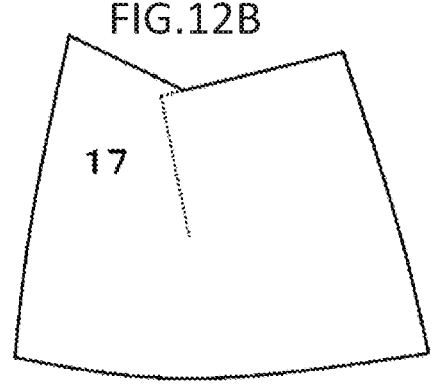
FIG. 12B is a schematic view of a shape of a metal mold arrangement-simulating object without wrinkles on the surface thereof obtained in Example 8 or the like, as seen in the thickness direction thereof.
Figure 12C:
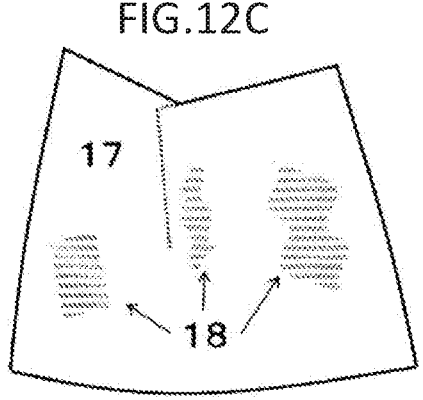
FIG. 12C is a schematic view of a shape of a metal mold arrangement-simulating object with wrinkles on the surface thereof obtained in Example 10 or the like, as seen in the thickness direction thereof.

From the base material obtained in Manufacturing Example 1, a press-molding material having a shape shown in FIG. 10, FIG. 11, and FIG. 12A having two adjacent self-laminatable regions (in which the horizontal width was 100 mm, the vertical height is 100 mm (that is, width 100 mm, depth 100 mm), the thickness was 1.4 mm, the curvature radius was 0 mm, the greatest distance b between the two self-laminatable regions was 28 mm, the total length L of the portions of the two circumferences of the self-laminatable regions facing each other was 102 mm, and the distance c between the midpoint of the straight line connecting the ends of the mutually facing parts of the two circumferences of the self-laminatable regions and the joining portion was 49 mm) was prepared by the same procedure as in Example 1. For clarity, FIG. 10, FIG. 11, and FIG. 12A show shapes in a case where the same press-molding material is viewed in the thickness direction while appropriately combining reference numerals indicating parts relating to the present invention.

As shown in FIG. 12A, the press-molding material was heated to a temperature which is the softening temperature or higher of the thermoplastic resin as the matrix and set to a plastic state. Then one self-laminatable region was pulled at 45° in the counterclockwise direction seen in the thickness direction of the press-molding material, laminated on the other self-laminating region and deformed to obtain a metal mold arrangement-simulating object. Wrinkles were not generated in the metal mold arrangement-simulating object, including a location corresponding to the periphery of the joining portion having the curvature radius R in the press-molding material. Therefore, when the press-molding material is cold press molded, it is possible to obtain a shaped product having the same shape as that of the metal mold arrangement-simulating object having a very good appearance without wrinkles.

Example 9

An operation was performed in the same manner as in Example 8 except that, regarding the size and shape of the press-molding material, the curvature radius was 1 mm, the distance b was 30 mm, the total length L was 106 mm, and the distance c was 51 mm. This metal mold arrangement-simulating object also included a location corresponding to the periphery of the joining portion having the curvature radius R in the press-molding material, and wrinkles were not generated.

Example 10

An operation was performed in the same manner as in Example 8 except that, regarding the size and shape of the press-molding material, the curvature radius was 2 mm, the distance b was 31 mm, the total length L was 106 mm, and the distance c was 51 mm. In the obtained metal mold arrangement-simulating object, wrinkles were generated in a location corresponding to the periphery of the joining portion having the curvature radius R in the press-molding material. Thus, in a case where the press-molding material is cold press molded by a known method without taking special measures and a shaped product having the same shape as that of the metal mold arrangement-simulating object is obtained, there is a concern that the shaped product will have wrinkles on the surface thereof and have problems in terms of appearance.

Example 11

An operation was performed in the same manner as in Example 8 except that, regarding the size and shape of the press-molding material, the thickness was 2.6 mm. The obtained metal mold arrangement-simulating object also included a location corresponding to the periphery of the joining portion having the curvature radius R in the press-molding material, and wrinkles were not generated.

Example 12

An operation was performed in the same manner as in Example 8 except that, regarding the size and shape of the press-molding material, the thickness was 2.6 mm, the curvature radius was 1 mm, the distance b was 30 mm, the total length L was 106 mm, and the distance c was 51 mm. The obtained metal mold arrangement-simulating object also included a location corresponding to the periphery of the joining portion having the curvature radius R in the press-molding material, and wrinkles were not generated.

Example 13

An operation was performed in the same manner as in Example 8 except that, regarding the size and shape of the press-molding material, the thickness was 2.6 mm, the curvature radius was 2 mm, the distance b was 31 mm, the total length L was 106 mm, and the distance c was 51 mm. The obtained metal mold arrangement-simulating object also included a location corresponding to the periphery of the joining portion having the curvature radius R in the press-molding material, and wrinkles were not generated.

Example 14

An operation was performed in the same manner as in Example 8 except that, regarding the size and shape of the press-molding material, the thickness was 2.6 mm, the curvature radius was 3 mm, the distance b was 34 mm, the total length L was 108 mm, and the distance c was 51 mm. The obtained metal mold arrangement-simulating object also included a location corresponding to the periphery of the joining portion having the curvature radius R in the press-molding material, and wrinkles were not generated.

Example 15

An operation was performed in the same manner as in Example 8 except that, regarding the size and shape of the press-molding material, the thickness was 2.6 mm, the curvature radius was 4 mm, the distance b was 36 mm, the total length L was 108 mm, and the distance c was 51 mm. The obtained metal mold arrangement-simulating object also included a location corresponding to the periphery of the joining portion having the curvature radius R in the press-molding material, and wrinkles were not generated.

Example 16

An operation was performed in the same manner as in Example 8 except that, regarding the size and shape of the press-molding material, the thickness was 2.6 mm, the curvature radius was 5 mm, the distance b was 36 mm, the total length L was 108 mm, and the distance c was 50 mm. In the obtained metal mold arrangement-simulating object, wrinkles were generated in a location corresponding to the periphery of the joining portion having the curvature radius R in the press-molding material.

Example 17

An operation was performed in the same manner as in Example 8 except that, regarding the size and shape of the press-molding material, the thickness was 4.0 mm. In the obtained metal mold arrangement-simulating object, wrinkles were generated in a location corresponding to the periphery of the joining portion having the curvature radius R in the press-molding material.

Example 18

An operation was performed in the same manner as in Example 8 except that, regarding the size and shape of the press-molding material, the thickness was 4.0 mm, the curvature radius was 1 mm, the distance b was 30 mm, the total length L was 106 mm, and the distance c was 51 mm. The obtained metal mold arrangement-simulating object also included a location corresponding to the periphery of the joining portion having the curvature radius R in the press-molding material, and wrinkles were not generated.

Example 19

An operation was performed in the same manner as in Example 8 except that, regarding the size and shape of the press-molding material, the thickness was 4.0 mm, the curvature radius was 2 mm, the distance b was 31 mm, the total length L was 106 mm, and the distance c was 51 mm. The obtained metal mold arrangement-simulating object also included a location corresponding to the periphery of the joining portion having the curvature radius R in the press-molding material, and wrinkles were not generated.

Example 20

An operation was performed in the same manner as in Example 8 except that, regarding the size and shape of the press-molding material, the thickness was 4.0 mm, the curvature radius was 3 mm, the distance b was 34 mm, the total length L was 108 mm, and the distance c was 51 mm. The obtained metal mold arrangement-simulating object also included a location corresponding to the periphery of the joining portion having the curvature radius R in the press-molding material, and wrinkles were not generated.

Example 21

An operation was performed in the same manner as in Example 8 except that, regarding the size and shape of the press-molding material, the thickness was 4.0 mm, the curvature radius was 4 mm, the distance b was 36 mm, the total length L was 108 mm, and the distance c was 51 mm. The obtained metal mold arrangement-simulating object also included a location corresponding to the periphery of the joining portion having the curvature radius R in the press-molding material, and wrinkles were not generated.

Example 22

An operation was performed in the same manner as in Example 8 except that, regarding the size and shape of the press-molding material, the thickness was 4.0 mm, the curvature radius was 5 mm, the distance b was 36 mm, the total length L was 108 mm, and the distance c was 50 mm. In the obtained metal mold arrangement-simulating object, wrinkles were generated in a location corresponding to the periphery of the joining portion having the curvature radius R in the press-molding material.

Example 23

An operation was performed in the same manner as in Example 8 except that, regarding the size and shape of the press-molding material, the thickness was 5.5 mm. In the obtained metal mold arrangement-simulating object, wrinkles were generated in a location corresponding to the periphery of the joining portion having the curvature radius R in the press-molding material. Similarly, in any case where the curvature radius was 1 to 5 mm, 6 mm, or 7 mm, wrinkles appeared at locations corresponding to the periphery of the joining portion.

INDUSTRIAL APPLICABILITY

Using the press-molding material of the present invention makes it possible to produce a shaped product excellent in appearance, strength, light weight property, and the like with high productivity. The shaped product is suitable for housings for electric/electronic equipment, structural members for automobiles, components for medical equipment, building materials, aircraft components, general industrial components, and the like.

While the present invention has been described in detail and with reference to specific embodiments, it will be apparent to those skilled in the art that it is possible to make various changes and modifications without departing from the spirit and scope of the present invention.

This application is based on Japanese Patent Application (Japanese Patent Application No. 2015-254639) filed on Dec. 25, 2015, the contents of which are incorporated herein by reference.

REFERENCE SIGNS LIST b GREATEST DISTANCE BETWEEN TWO SELF-LAMINATABLE REGIONS
c DISTANCE BETWEEN MIDPOINT OF STRAIGHT LINE CONNECTING ENDS OF MUTUALLY FACING PORTIONS OF TWO CIRCUMFERENCES OF SELF-LAMINATABLE REGIONS AND JOINING PORTION
1 SELF-LAMINATABLE REGION
2 STANDABLE PLANE
3 REFERENCE PLANE
4 SHAPED PRODUCT
5 LAMINATED PORTION
6 WELD LINE
7 METAL MOLD (LOWER MOLD)
8 MECHANICAL MECHANISM
9 PRESS-MOLDING MATERIAL
10 PRELIMINARY LAMINATING REGION
11 ELEMENTS (EACH OF NUMBER OF ELEMENTS WHICH ARE FINITELY DIVIDED FROM STRUCTURE IN ORDER TO PERFORM NUMERICAL ANALYSIS BY FINITE ELEMENT METHOD)
12 ELEMENTS INCLUDED IN LAMINATABLE PORTION OF STRUCTURE
13 JOINING PORTION (CURVATURE RADIUS R) OF TWO CIRCUMFERENCES OF SELF-LAMINATABLE REGIONS
14 TOTAL LENGTH L OF MUTUALLY FACING PORTIONS OF TWO CIRCUMFERENCES OF SELF-LAMINATABLE REGIONS
15 ENDS OF TWO CIRCUMFERENCES OF SELF-LAMINATABLE REGIONS FACING EACH OTHER WITH BAY-SHAPED SPACE REGION THEREBETWEEN
16 BAY-SHAPED VOID REGION
17 METAL MOLD ARRANGEMENT-SIMULATING OBJECT
18 WRINKLES
19 STRAIGHT LINE CONNECTING ENDS ON MOUTH SIDE OF BAY-SHAPED VOID REGION
100-1 SHAPED PRODUCT HAVING SELF-LAMINATED STRUCTURE HAVING A JOINING PORTION WITH FLAT SHAPE
100-2 SHAPED PRODUCT HAVING SELF-LAMINATED STRUCTURE HAVING A JOINING PORTION WITH CORNER SHAPE
100-3 SHAPED PRODUCT HAVING SELF-LAMINATED STRUCTURE HAVING A JOINING PORTION WITH CURVED SURFACE SHAPE
100-1 SHAPED PRODUCT HAVING WELD LINE AND JOINING PORTION WITH FLAT SHAPE
200-2 SHAPED PRODUCT HAVING WELD LINE AND JOINING PORTION WITH CORNER SHAPE
300-3 SHAPED PRODUCT HAVING WELD LINE AND JOINING PORTION WITH CURVED SURFACE SHAPE

The invention claimed is:

1. A press-molding material comprising:
discontinuous reinforcing fibers having an average fiber length of 3 mm to 100 mm, and a thermoplastic resin as a matrix, the press-molding material having
a certain reference plane;
at least one standable plane; and
two adjacent self-laminatable regions,
wherein the press-molding material has a substantially concave shape in which a bay-shaped space region is formed by the two adjacent self-laminatable regions in a shape projected in a thickness direction of the press-molding material, and
wherein a portion of the standable plane is included in at least one of the self-laminatable regions.

2. The press-molding material according to claim 1, wherein the discontinuous reinforcing fibers are two-dimensionally randomly oriented in the thermoplastic resin as the matrix.

3. The press-molding material according to claim 1, wherein the discontinuous reinforcing fibers and the thermoplastic resin as a matrix have a volume fraction of reinforcing fibers (Vf) of 5% to 80% as defined in Expression (u)

$Vf=100\times$(Volume of discontinuous reinforcing fibers)/((Volume of discontinuous reinforcing fibers+Volume of thermoplastic resin)) (u).

4. The press-molding material according to claim 1, wherein a plurality of the standable planes are provided, and
in these self-laminatable regions, at least one location includes a portion of each of the plurality of the standable planes or includes each of a portion of the standable planes and a portion of the reference plane.

5. The press-molding material according to claim 1, wherein the greatest distance b between the two adjacent self-laminatable regions is 500 mm or less.

6. The press-molding material according to claim 1, wherein a joining portion on circumferences of the two adjacent self-laminatable regions has a shape with a curvature radius R of 0 mm or more and less than 5 mm.

7. The press-molding material according to claim 1, wherein a thickness of at least one self-laminatable region in the two adjacent self-laminatable regions is less than 5.5 mm.

8. The press-molding material according to claim 1, wherein a thickness of at least one self-laminatable region in the two adjacent self-laminatable regions is less than 4.0 mm, and
a joining portion on circumferences of the two adjacent self-laminatable regions has a shape with a curvature radius R of 0 mm or more and less than 5 mm.

9. The press-molding material according to claim 1, wherein a thickness of at least one self-laminatable region in the two adjacent self-laminatable regions is 4.0 mm or more and less than 5.5 mm, and
a joining portion on circumferences of the two adjacent self-laminatable regions has a shape with a curvature radius R of 1 mm or more and less than 5 mm.

10. The press-molding material according to claim 1, wherein a joining portion on circumferences of the two adjacent self-laminatable regions has a shape with a curvature radius R of 0 mm or more and less than 5 mm, and
a total length L of portions facing each other at the circumferences of the two adjacent self-laminatable regions and a distance c between a midpoint of a straight line connecting ends of portions of circumferences of the two adjacent self-laminatable regions facing each other and the joining portion satisfy Expression (q)

$L/c \geq 1.5$ (here, units of $L$ and $c$ are the same)     (q).

11. A shaped product of a composite material comprising discontinuous reinforcing fibers having an average fiber length of 3 mm to 100 mm, and a thermoplastic resin as a matrix,
wherein the shaped product has a three-dimensional shape having a certain reference plane; and one or more standing planes,
wherein the composite material forms a self-laminated structure in at least at one location in a boundary region between the certain reference plane and the standing planes, and there is no weld line at any ridgeline where the reference plane and the standing plane are in contact with each other.

12. The shaped product according to claim 11,
wherein the discontinuous reinforcing fibers are two-dimensionally randomly oriented in the composite material.

13. The shaped product according to claim 11,
wherein the discontinuous reinforcing fibers and the thermoplastic resin have a volume fraction of reinforcing fibers (Vf) of 5% to 80% as defined by Expression (u)

$Vf=100\times$(Volume of discontinuous reinforcing fibers)/((Volume of discontinuous reinforcing fibers)+(Volume of thermoplastic resin))     (u).

14. The shaped product according to claim 11,
wherein a plurality of standing planes are provided, and
wherein the composite material forms a self-laminated structure in at least one location in a boundary region between the standing planes and there is no weld line in any ridgeline where the standing planes are in contact with each other.

15. A method for manufacturing a shaped product which is the shaped product according to claim 11,
wherein, using a metal mold having an upper mold and a lower mold in which a molding cavity is formed by clamping the upper mold and the lower mold,
a press-molding material including discontinuous reinforcing fibers having an average fiber length of 3 mm to 100 mm and a thermoplastic resin as a matrix and having a certain reference plane, at least one standable plane, and at least one self-laminatable region, in which a portion of the standable plane is included in the self-laminatable regions, is arranged in the metal mold and subjected to press-molding, and
wherein the press-molding material is arranged in the molding cavity of the metal mold in a state where the self-laminatable region is self-laminated so as to create a site with a width of 20 mm or more.

16. The method for manufacturing a shaped product according to claim 15, comprising
wherein the press-molding material is heated to a temperature equal to or higher than the softening temperature of the thermoplastic resin as a matrix, the standable plane is made to stand with respect to the reference plane of the press-molding material in the metal mold at a temperature lower than the softening temperature, the self-laminatable region is arranged so as to be self-laminated, and press-molding is carried out.

17. The method for manufacturing a shaped product according to claim 15,
wherein the shaped product is obtained from the press-molding material by a single press-molding.

18. The method for manufacturing a shaped product according to claim 15,
wherein arrangement of a press-molding material in the metal mold is performed by a mechanical mechanism.

19. The method for manufacturing a shaped product according to claim 15,
wherein, when a projected area of the press-molding material in a clamping direction is defined as a blank area, in the arranging of the press-molding material in the molding cavity of the metal mold, at least one sheet of the press-molding material is arranged so as to form the blank area with a ratio of 90 to 110% with respect to a product part area defined as a projected area of the molding cavity in the clamping direction of the metal mold.

20. A method for manufacturing a press-molding material comprising discontinuous reinforcing fibers having an average fiber length of 3 mm to 100 mm, and a thermoplastic resin as a matrix, the press-molding material having a certain reference plane; at least one standable plane; and at least one self-laminatable region, wherein a portion of the standable plane is included in the self-laminatable region, the method, comprising:
a step of processing an object formed of a composite material comprising discontinuous reinforcing fibers having an average fiber length of 3 mm to 100 mm and a thermoplastic resin as a matrix to form a press-molding material with a shape satisfying i) and ii) below:
i) the shape being obtained by developing a three-dimensional shape of a shaped product which is a target for press-molding, the three-dimensional shape of the shaped product being subjected to inverse analysis of molding process and developed by a computer; and
ii) the shape being obtained by developing the three-dimensional shape of the shaped product as the target, the three-dimensional shape from which at least one element is removed during the inverse molding analysis.

* * * * *